(12) United States Patent
Uenoyama et al.

(10) Patent No.: US 6,798,837 B1
(45) Date of Patent: Sep. 28, 2004

(54) VIDEO CODING METHOD AND VIDEO CODING APPARATUS

(75) Inventors: Tsutomu Uenoyama, Kanagawa (JP); Daisaku Komiya, Tokyo (JP); Osamu Iwasaki, Tokyo (JP); Minoru Etoh, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/507,040

(22) Filed: Feb. 18, 2000

(30) Foreign Application Priority Data

Feb. 24, 1999 (JP) ............................................ 11-046217

(51) Int. Cl.[7] .......................... H04N 7/12; H04N 11/02; H04N 11/04
(52) U.S. Cl. ................................................. 375/240.16
(58) Field of Search ....................... 375/240.02, 240.12, 375/240.16, 240.18, 240.23, 240.24, 240.25, 240.29; H04N 7/12, 11/02, 11/04

(56) References Cited

U.S. PATENT DOCUMENTS

| | | | | |
|---|---|---|---|---|
| 5,635,985 A | * | 6/1997 | Boyce et al. | ........... 375/240.15 |
| 5,652,849 A | * | 7/1997 | Conway et al. | ............. 345/719 |
| 5,657,416 A | | 8/1997 | Boon | |
| 5,677,735 A | * | 10/1997 | Ueno et al. | ............. 375/240.15 |
| 5,709,473 A | * | 1/1998 | Sultan et al. | ................ 374/131 |
| 5,870,146 A | * | 2/1999 | Zhu | ....................... 375/240.03 |
| 5,969,750 A | * | 10/1999 | Hsieh et al. | ............... 348/14.1 |
| 6,081,295 A | * | 6/2000 | Adolph et al. | ......... 375/240.03 |
| 6,226,328 B1 | * | 5/2001 | Assuncao | .............. 375/240.26 |
| 6,275,536 B1 | * | 8/2001 | Chen et al. | ............. 375/240.25 |
| 6,434,197 B1 | * | 8/2002 | Wang et al. | ........... 375/240.29 |
| 6,441,754 B1 | * | 8/2002 | Wang et al. | ................... 341/50 |
| 6,498,814 B1 | * | 12/2002 | Morel | .................... 375/240.12 |

FOREIGN PATENT DOCUMENTS

| | | |
|---|---|---|
| EP | 0 823 822 A2 | 2/1998 |
| EP | 0 845 908 A2 | 6/1998 |
| WO | WO 97/40626 | 10/1997 |
| WO | WO 98/19460 | 5/1998 |

OTHER PUBLICATIONS

Gertjan Keesman, Robert Hellinghuizen, Fokke Hoeksema and Geert Heideman, "Transcoding of MPEG Bitstreams", 1996 Elsevier Science B.V., pp. 481–500.

P.N. Tudor and O.H. Werner, "Real–Time Transcoding of MPEG–2 Video Bit Streams", Sep. 1997, International Broadcasting Convention, pp. 296–301.

Niklas Björk and Charilaos Christopoulos, "Transcoder Architectures for Video Coding", 1998 IEEE, pp. 88–98.

* cited by examiner

*Primary Examiner*—Nhon Diep
(74) *Attorney, Agent, or Firm*—Pearne & Gordon LLP

(57) ABSTRACT

A video coding method and apparatus realize that a calculation amount required to perform a converting process operation of compression formats can be reduced, and also deterioration in an image quality, which is caused by this compression format converting process operation, can be reduced. A video converting unit includes added information processing means for using added information contained in an input bit stream in coding operation. This added information involves a motion vector, a motion prediction difference signal, a quadrature converting coefficient, and a quantizing value.

42 Claims, 21 Drawing Sheets

FIG. 18

| 1 | 2 | 3 | | | | | | | | 11 | 12 | | | | | | | | | 21 | 22 |
|---|---|---|---|---|---|---|---|---|---|----|----|---|---|---|---|---|---|---|---|----|----|
| 23 | 24 | | | | | | | | | | | | | | | | | | | | 44 |
| 45 | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | |
| | | | | | | | | | | | | | | | | | | | | | 396 |

*FIG. 19*

| 1 | 2 | 3 | | | | | | 11 | 34 | | | | | | | 44 |
|---|---|---|---|---|---|---|---|---|---|---|---|---|---|---|---|---|
| 12 | | | A | | | | 21 | 22 | 45 | | B | | | | | 55 |
| 23 | | | | | | | | 33 | 56 | | | | | | | 66 |
| 67 | | | | | | | 77 | | | | | | | | | |
| | | | C | | | | | | | D | | | | | | |

(grid continues with labels E, F, G, H, I, J, K, L; number 396 in bottom-right)

VIDEO CODING METHOD AND VIDEO CODING APPARATUS

BACKGROUND OF THE INVENTION

The present invention is related to a video coding apparatus and a method thereof for coding a digital compressed video signal having a compression format to obtain a digital coded video signal having the same, or different compression format. More specifically, the present invention is directed to such a video coding apparatus and a video coding method, capable of coding the digital compressed video signal by utilizing information about the compression of this digital compressed video signal.

Recently, digital video signals are widely used in various technical fields, since technical aspects of digital data related to data transfer techniques, data storage techniques, and data process techniques have been developed. Most of these digital video signals are usually compressed so as to reduce coding amounts thereof. There are plural compression formats. However, there is no united compression format. Also, most of these plural compression formats do not own compatibility among these compression formats. As a consequence, there are many difficult cases that a video (picture) which has been compressed by a certain compression format cannot be directly used in a system with employment of another different compression format. Otherwise, even when the same compression format is employed in two systems, there are large differences in coding amounts per unit time (bit rates) between these two systems, since these two systems own different limitations in data transfers and data storage capacitances. Similarly, there are possibilities that a video which has been compressed in one bit rate cannot be utilized in a system which introduces the other bit rate.

Under such a circumstance, various compression format conversion techniques have been researched/developed by which digital video signals compressed in one compression format are converted into digital video signals compressed in another compression format. These conventional compression format converting techniques are known from, for instance, Japanese Laid-open Patent Application No. Hei-10-271494 opened in 1998. This opened conventional technique describes the method for converting the bit streams of the moving pictures having the spatial resolution different from each other. In this bit stream converting method, the moving picture which has been compressed in the MPEG-2 format and owns the high resolution is inputted, whereas the moving picture compressed in the H.263-recommended compression format and owns the low resolution. Then, this conventional converting technique is featured by that since the motion vector of the MPEG-2 formatted bit stream as the input video data is corrected, the corrected motion vector can be utilized as the motion vector of the H.263-formatted bit stream as the output video data.

However, the above-described prior art owns the following problems:

(1). Since the motion vector of the input stream (input bit stream) is utilized irrespective of the magnitude of the motion prediction error caused by the motion vector of the input stream, there are some cases that the input stream is coded based upon such a motion vector having a large motion prediction error. In this case, there is such a possibility that this coding operation may cause a larger prediction error to be produced, resulting in deterioration of image qualities.

(2). Since all of the actual images are decoded and then are re-coded, the errors may be produced in the decoding stage and also the re-coding stage. There is another possibility that these errors may cause the image quality to be deteriorated.

(3). Furthermore, a large number of calculation amount is necessarily required so as to execute the decoding process operation and the re-coding process operation.

SUMMARY OF THE INVENTION

The present invention has been made to solve the above-explained problems, and therefore, has an object to achieve the following aspects:

(1). When a motion vector of an input stream (input bit stream) is reused, deterioration in an image quality is reduced, which is caused by reusing such a motion vector having a large motion prediction error.

(2). Both a decoding operation for an input stream and a re-coding operation for an output stream are deleted, so that deterioration in image qualities which is caused in these process steps is reduced.

(3). Also, a calculation amount required in compression format converting operation is reduced.

Moreover, the present invention owns another object to shorten a process delay required in the compression format converting operation, as compared with that of the conventional compression format converting operation.

To achieve the above-described objects, a video coding method, according to the present invention, is featured such a video coding method for performing either a partial stage of all stages of a decoding process operation with respect of an input stream and for coding the decoded digital moving picture by way of the same, or different compression format as/from the compression format of the input stream to there by produce an output stream corresponding to a digital moving picture under different compression condition, in which the output stream is produced by utilizing added information corresponding to information other than a decoded pixel value of the input stream.

Also, the video coding method is featured by that when the input stream and the output stream own coding modes corresponding to information as to coding methods every subpicture, the coding mode of the output stream is determined based upon a coding mode of the corresponding subpicture of the input stream.

Also, the video coding method is featured by that when the output stream owns a coding mode every picture, the coding mode of the output stream is determined based upon the coding mode of the subpicture contained in the corresponding picture of the input stream.

Also, the video coding method is featured by that the video coding method includes a method for producing/referring to coding mode history information containing information for indicating how many subpictures of the output stream have been continuously inter-coded in the past for plural pictures counted from a picture under being coded; and when a subpicture which is intra-coded while the output stream is compressed is selected from a plurality of subpictures inter-coded in the input stream, the coding mode history information is utilized.

Also, the video coding method is featured by that when both the input stream and the output stream are compressed in the unit of a subpicture by way of a motion-compensatable format, a format of a motion vector of the input stream is changed into a format usable as a motion vector of the output stream, and the format-changed motion vector of the input stream is used as the motion vector of the output stream.

Also, the video coding method is featured by that a starting point for a searching operation is determined based upon a value of a motion vector of an input stream; and a motion vector searching operation is carried out so as to determine a motion vector of an output stream.

Also, the video coding method is featured by that when the motion vector of the input stream is such a motion vector obtained by using a filtering-processed reference image, the motion vector of the output stream is produced by converting the motion vector into a representation obtained by using a reference image to which the filtering process is not performed, and further by converting the converted motion vector into another representation which is obtained by using another filtering-processed reference image different from the reference image of the input stream.

Also, the video coding method is featured by that when the input stream owns both a motion vector every subpicture and subtraction information corresponding to a motion prediction error, a magnitude of the subtraction information is obtained so as to calculate an accurate degree of the motion vector, and a method for utilizing the motion vector of the input stream is changed in response to the magnitude of the accurate degree of the motion vector.

Also, the video coding method is featured by that a search range of a motion vector searching process operation is changed in response to the magnitude of the accurate degree of the motion vector.

Also, the video coding method is featured by that in response to the magnitude of the accurate degree of the motion vector, a judgement is made as to whether or not the motion vector searching process operation is carried out.

Also, the video coding method is featured by that in response to the magnitude of the accurate degree of the motion vector, a method for coding the corresponding subpicture of the output stream is changed.

Also, the video coding method is featured by that an intra picture in which an entire 1 picture is intra-coded is first detected by a video coding method for producing an output stream in the unit of a subpicture before an entire 1 picture of an input stream is entered.

Also, the video coding method is featured by that the intra picture is detected by executing a compression format converting process operation in the unit of the subpicture while producing intra block information corresponding to such information for recording thereon as to whether or not each of the subpictures in the picture of the input stream under process operation is intra-coded so as to detect the intra picture, and also by detecting that all of the subpictures contained in-the picture under process operation are intra-coded by referring to said intra block information at a time instant when all of the subpictures contained in 1 picture are entered from the input stream.

Also, the video coding method is featured by comprising a method for containing a quadrature converting coefficient contained in the input stream, while not inverse-quadrature-converting the input stream into the output stream.

Also, the video coding method is featured by comprising a method for containing a quantized quadrature converting coefficient contained in the input stream, while not inverse-quadrature-converting and not dequantizing the input stream into the output stream.

Also, the video coding method is featured by that in the case that the subpicture of the input stream is intra-coded, the subpicture is intra-coded when the output stream is produced; and either the quadrature converting coefficient or the quantized quadrature converting coefficient of the subpicture of the input stream is employed as either a quadrature converting coefficient or a quantized quadrature converting coefficient of the subpicture of the output stream.

Also, the video coding method is featured by that when a subpicture of the input stream is inter-coded in connection with a motion compensation, the subpicture is inter-coded in connection with the motion compensation while the output stream is produced; and either a quadrature converting coefficient or a quantized quadrature converting coefficient, which corresponds to subtraction information of the subpicture of the input stream, is used as either a quadrature converting coefficient or a quantized quadrature converting coefficient, which corresponds to subtraction information of the subpicture of the output stream.

Also, the video coding method is featured by that with respect to a quantizing matrix indicative of a relationship between a position and a quantizing value within an area in the quadrature converting unit of each of the quadrature converting coefficient, the same quantizing matrix as that of each of the subpictures of the input stream is set to the relevant subpicture of the output stream; and each of the quadrature converting coefficients of the output stream is quantized by the same quantizing value as that of the quadrature coefficient at the corresponding position of the input stream.

Also, the video coding method is featured by that the quantizing value of each of the subpictures of the output stream is set in such a manner that a quantizing value with respect to a quadrature converting coefficient of a low frequency area of the subpicture is made identical to a quantizing value with respect to the corresponding quadrature converting coefficient of the input stream.

Also, the video coding method is featured by that in the case that there are plural subpictures of an input stream corresponding to a subpicture of an output stream, the coding mode of the subpicture of the output stream is set as an intra-coding mode subject when at least one of the subpictures of the corresponding input stream is intra-coded; and the coding mode of the subpicture of the output stream is set to an intra-coding mode in such a case that a total number at which after the subpicture corresponding to the intra-coding mode subject has been finally intra-coded, the subpicture is continuously intra-coded exceeds a predetermined threshold value.

Also, the video coding method is featured by that in the case that a coding order of subpictures contained in 1 picture of an input stream is different from that of an output stream, the output stream is produced after the plural subpictures of the input stream have been stored, the total number being equal to such a number at which the subpictures of the input streams can be continuously coded in the coding order of the output stream.

BRIEF DESCRIPTION OF THE DRAWINGS

FIG. 18 is a diagram for indicating a structure of macroblocks for an MPEG-4-formatted image having a CIF size, and a coding order thereof;

FIG. 19 is a diagram for indicating a structure of macroblocks for an H.261-formatted image having a CIF size, and coding order thereof;

DETAIL DESCRIPTION OF THE PREFERRED EMBODIMENTS

Next, an embodiment of the present invention will now be described with reference to drawings.

First Embodiment

In a first embodiment, a description will now be made of a video (picture) signal converting apparatus for converting a video signal which is compressed by way of the H.261-recommended format into another video signal which is compressed by way of the MPEG-4-visual format. For the sake of a simple explanation and a more concrete explanation, it is now assumed that a video signal (picture signal) employed in this first embodiment owns such an image size defined by 144 pixels along the longitudinal direction and 176 pixels along the lateral direction. This image size (screen size) is known as the QCIF (Quarter Common Interface Format). It should be understood that this assumption of the image size and the compression format does not restrict the technical scope of the present invention.

Figure 1:
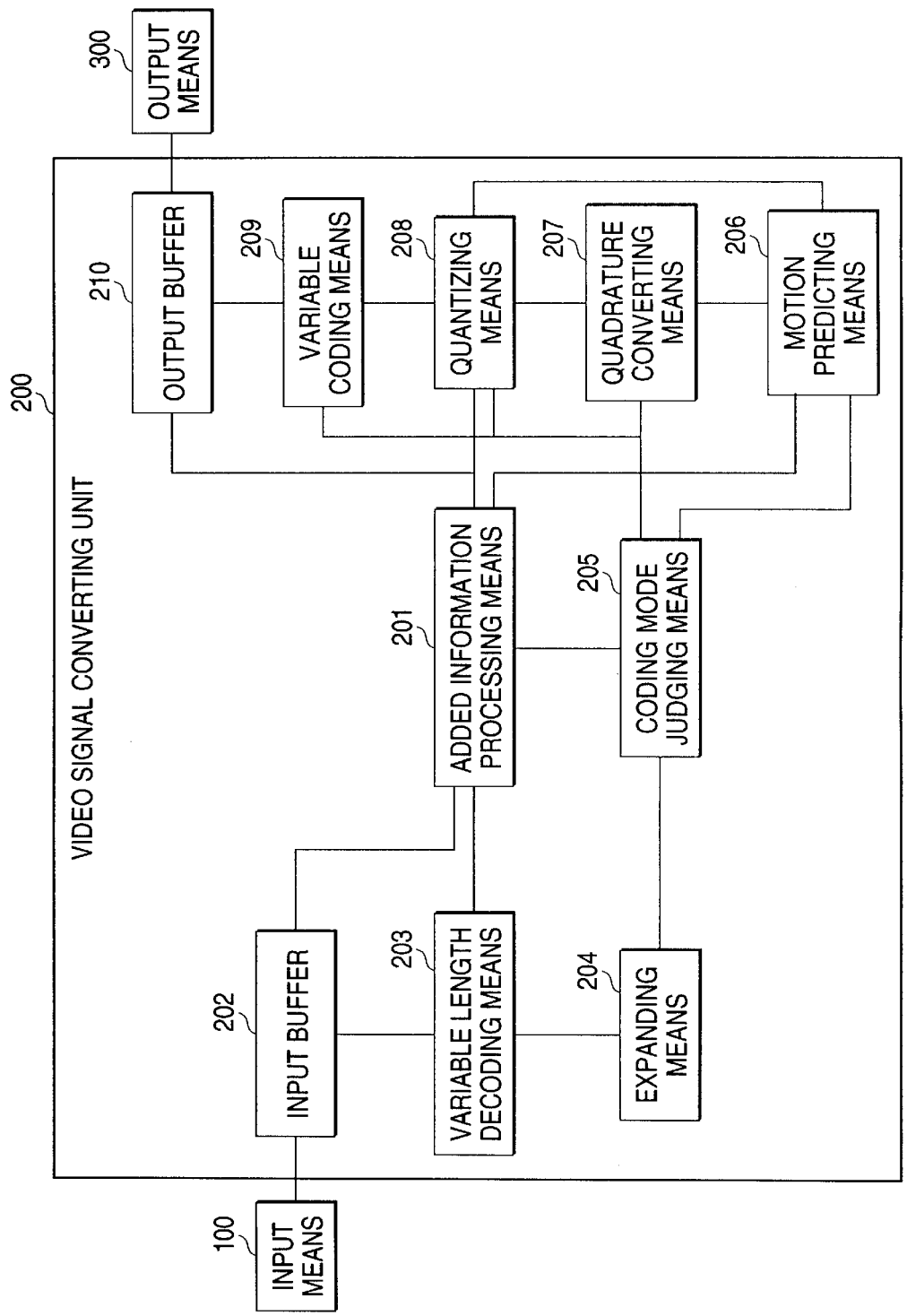
FIG. 1 is a functional block diagram of a video coding apparatus.

First of all, an arrangement of this video signal converting apparatus will now be explained. FIG. 1 is a functional block diagram of this video signal converting apparatus. This video signal converting apparatus is arranged by input means 100, added information processing means 201, an input buffer 202, variable length decoding means 203, expanding means 204, coding mode judging means 205, motion predicting means 206, quadrature converting means 207, quantizing means 208, variable length coding means 209, an output buffer 210, and output means 300.

Figure 2:
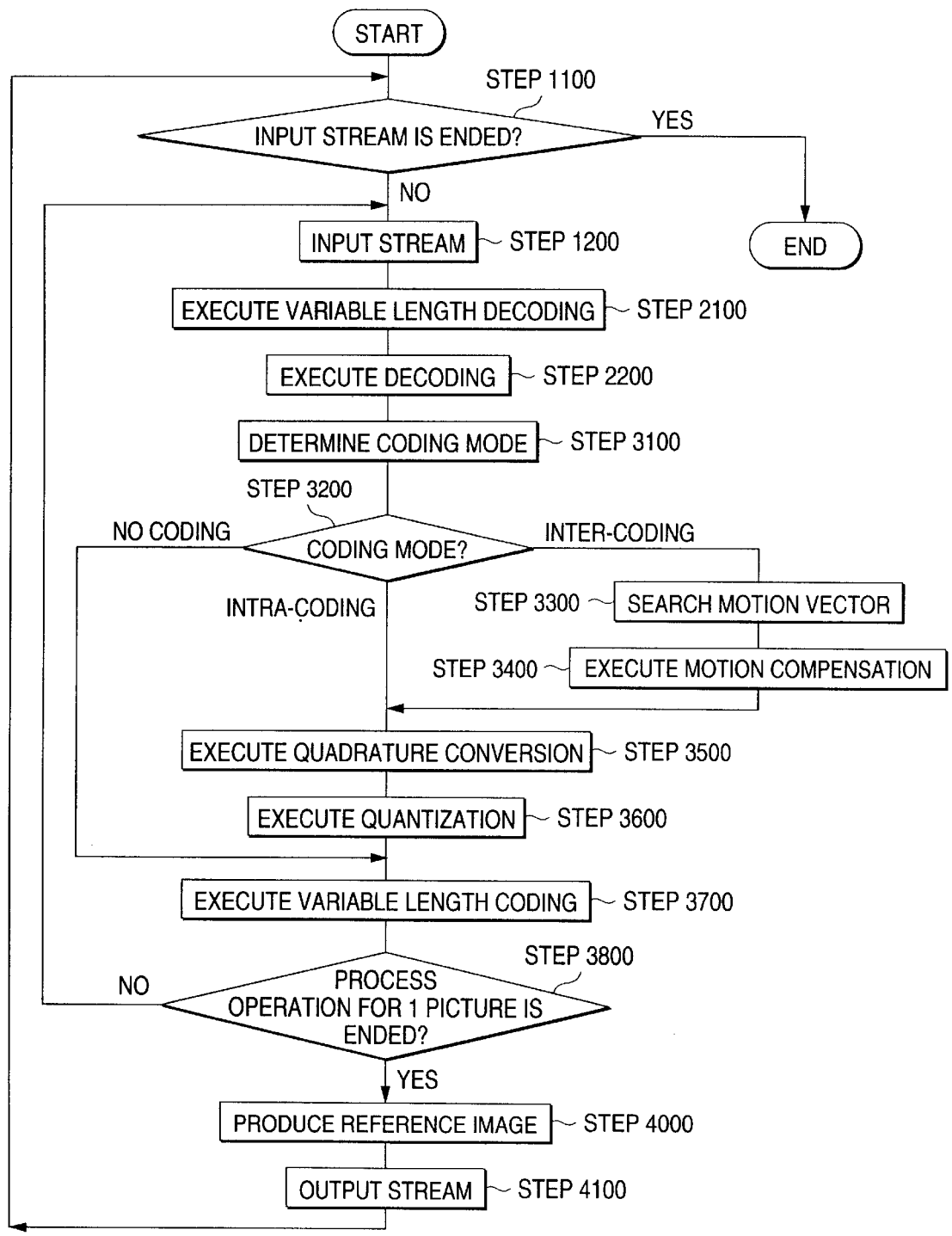
FIG. 2 is a flow chart for describing an overall process operation of the video coding apparatus.

Next, as to an overall process operation of this video signal converting apparatus, a basic process flow will now be explained with reference to FIG. 2. This apparatus is featured by such a fact that while information contained in a compressed video signal inputted into this apparatus is utilized, a process operation for coding this video signal in the compression format is carried out in a high speed, or an image quality of the coded signal is increased. It should also be noted that the process operation shown in FIG. 2 does not contain this featured process operation. This featured process operation will be later explained more in detail. As indicated in FIG. 2, this apparatus executes the converting process operation of the compressed video signal in the next process flow.

step 1100: If an input stream which is not yet processed is present, step 1200: then the input means 100 enters the unprocessed input stream into the input buffer 202.

step 2100: The variable length decoding means 203 sequentially derives the input stream from the input buffer 202 and then variable-length-decodes the derived input stream by way of a method regulated by the coding standard, step 2200: the expanding means 204 expands the input stream which has been variable-length-decoded in accordance with the known general method to obtain a non-compressed video signal.

step 3100: Next, the coding mode judging means 205 performs a coding mode judgement involving such a judgment. That is, the coding mode judging means 205 judges as to whether the video signal acquired from the expanding means 204 is compressed within a frame, compressed between frames, or is not coded in the unit of either a picture unit or a macroblock.

step 3200: If the judged result is the video signal compressed between frames, step 3300: then the motion predicting means 206 performs a motion vector search so as to acquire a motion vector corresponding to each of the macroblocks.

step 3400: The motion predicting means 206 executes a motion compensating process operation, for example, subtraction information is acquired based upon the acquired motion vector.

step 3500: The quadrature converting means 207 directly quadrature-converts (DCT) the video signal compressed within frame, and quadrature-converts the subtraction information as to the video signal compressed between frames.

step 3600: Next, the quantizing means 208 quantizes a DCT coefficient produced by the quadrature converting means 207.

step 3700: Subsequently, the variable length coding means 209 codes into a variable length code, motion information such as the motion vector, produced by the motion predicting means 206, the DCT coefficient quantized by the quantizing means 208, and information for notifying that no code is contained in such a block which is not coded. Then, the motion predicting means 206 outputs the coded result to the output buffer 210.

step 3800: A similar process operation is repeatedly carried out until all of the converting process operations as to a macroblock for 1 picture are completed (namely, process operation is returned to step 1200). If the converting process operations for the macroblock for 1 picture are accomplished, step 4000: the motion predicting means 206 produces a reference image which is employed in a motion prediction from the present picture to the next picture.

step 4100: Finally, the output means 300 derives an output stream from the output buffer 210, and outputs the derived output stream, and then executes the converting process operation for the next picture (namely, process operation is returned to previous step 1100).

Next, a description will now be made of operation of the added information processing means 201 which constitutes the feature of the present invention. The function of this added information processing means 201 is to control a process operation of producing an output stream by using a feature amount of an input stream, namely to control a coding process operation. There are plural sorts of feature amounts of input streams which can be utilized by the added information processing means 201, and also a plurality of use methods for using the feature amount of this input stream. These feature amount sorts and using methods thereof may be separately applied, or may be combined with each other to apply the combined result to the added information processing means 201. In this embodiment, these embodiments will be independently explained as follows:

Utilization Example 1 of Added Information

As a first utilization example of the added information, while a coding mode of an input stream is utilized, a coding mode of a relevant portion of an output frame is determined. In this specification, a coding mode indicates a coding method, for instance, when a video signal is compressed within frame (intra)/between frames (inter), or compressed between frames, a check is made as to whether or not subtraction information and/or motion vector are used.

Figure 3A:
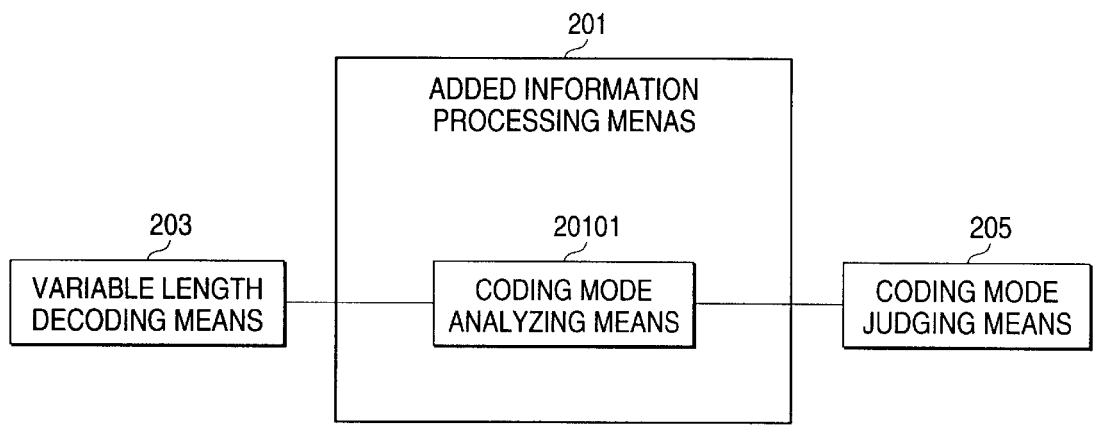
FIG. 3 is a functional block diagram of added information processing means by utilizing a coding mode of an input stream.
Figure 3B:
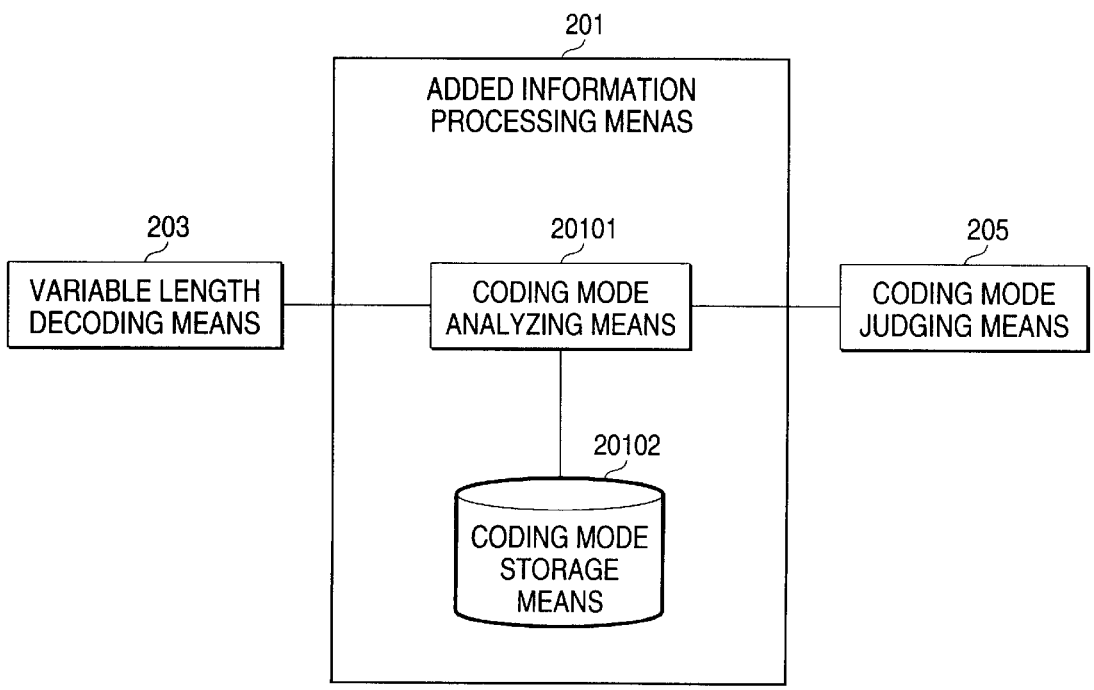

FIGS. 3A and 3B are structural diagrams for showing the added information processing means 201 which utilizes a coding mode of an input stream. FIG. 3A is a structural diagram of the added information processing means 201 capable of only determining a coding mode in the unit of a macroblock, and FIG. 3B is a structural diagram for indicating the added information processing means 201 capable of coding modes in the unit of a macroblock and also in the unit of a picture. A description will now be made of process flow operations executed in the respective structures.

Figure 4A:
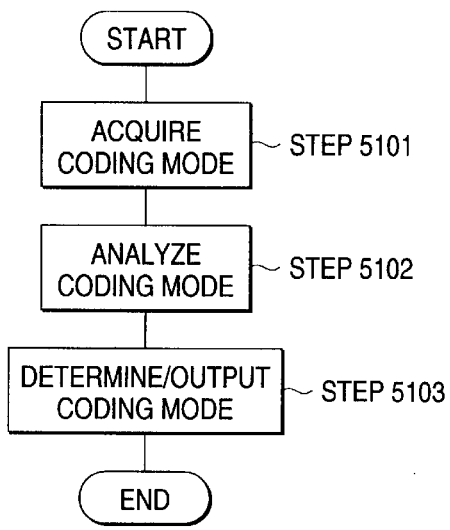
FIG. 4 is a flow chart for describing an added information processing operation by utilizing the coding mode of the input stream.
Figure 4B:
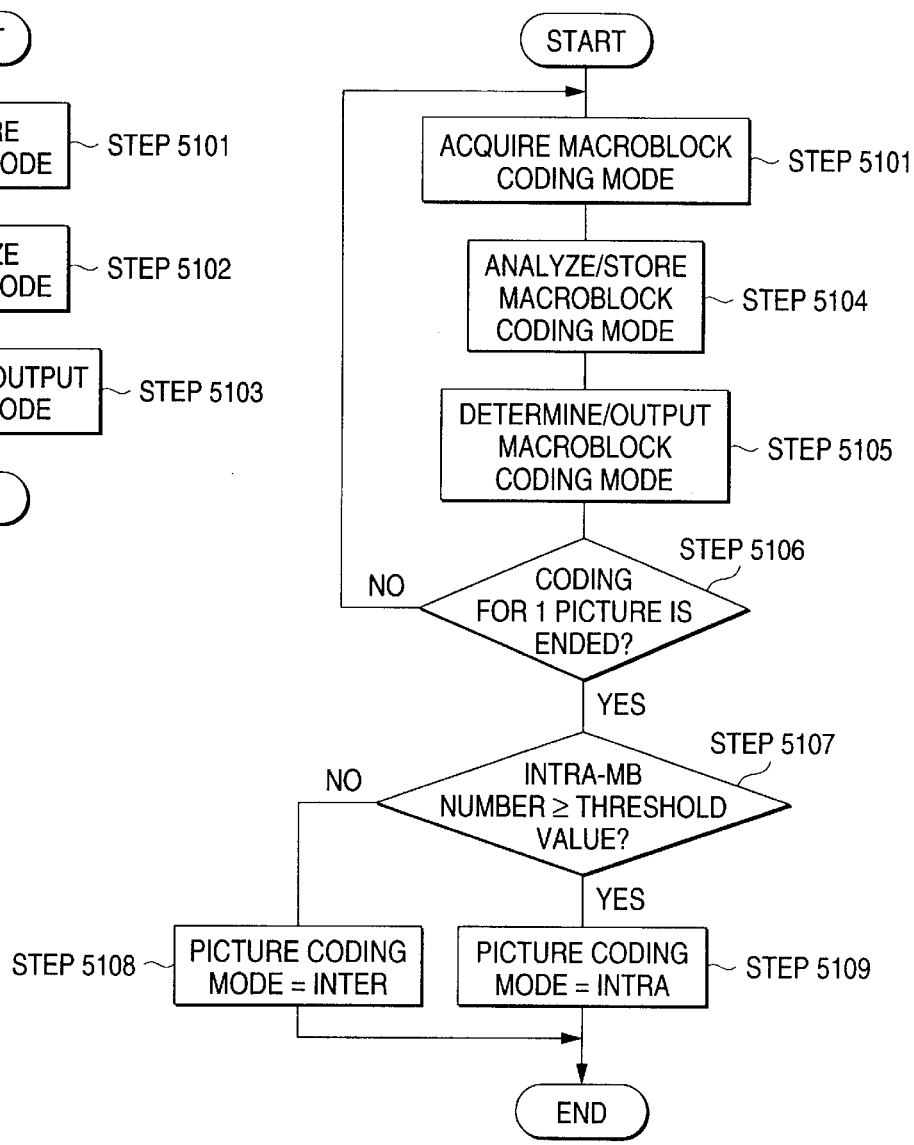

FIG. 4A is a flow chart for describing a process operation executed when a coding mode is determined in the unit of a macroblock, and FIG. 4B is a flow chart for explaining a process operation executed when an inter/intra-coding mode is determined in the unit of a picture in addition to the coding mode in the unit of the macroblock. FIG. 4A indicates such a process operation corresponding to the structure of FIG. 3A, whereas FIG. 4B shows a process operation corresponding to the structure of FIG. 3B.

A description will now be made of a process flow operation shown in FIG. 4A. As indicated in FIG. 4A, a determining process operation of a coding mode in the unit of a macroblock is carried out.

step 5101: First, a coding mode analyzing means 20101 acquires information related to a coding mode of an input stream in the unit of the macroblock by the variable length decoding means 203.

step 5102: The coding mode analyzing means 20101 selects information useful to the output stream from the acquired information of the coding mode.

step 5103: The coding mode analyzing means 20101 determines the selected value as the coding mode of the output stream, and then outputs the determined coding mode to the coding mode judging means 205.

Alternatively, it is also possible to discriminate, for example, the intra coding mode from the inter coding mode as to the information of the coding mode selected by the above-explained coding mode analyzing process operation (step 5102). In this alternative case, the process operation required to judge a coding mode of a non-compressed moving picture as the intra coding mode may be omitted when this non-compressed moving picture is coded, resulting in a high speed processing operation. In other words, it is possible to omit such a process operation that the coding mode judging means 205 calculates a difference between this non-compressed moving picture and a reference image (reference picture), and judges the coding mode of this non-compressed moving picture as the intra coding mode when this subtraction is large.

Alternatively, the coding mode judging process operation may be reduced by selecting/utilizing such information that the present macroblock is the same as the macroblock located at the same position of the preceding frame - - - ??? Concretely speaking, the reduction of the coding mode judging process operation may be realized by omitting such a process operation that when a non-compressed moving picture is coded, a coding mode of this non-compressed moving picture is judged as a macroblock coding mode without a code. That is, in this required process operation, the coding mode judging means 205 calculates a difference between a present frame and a preceding frame, and judges the present macroblock as a macroblock without code when this difference is sufficiently small.

A description will now be made of a process flow operation shown in FIG. 4B. As indicated in FIG. 4B, a determining process operation of a coding mode including a coding mode determining process operation in the unit of a picture is carried out.

step 5101: First, the coding mode analyzing means 20101 acquires information related to a coding mode of an input stream in the unit of the macroblock by the variable length decoding means 203.

step 5104: The coding mode analyzing means 20101 selects information useful to the output stream from the acquired information of the coding mode. The coding mode analyzing means 20101 stores the selected information into a coding mode storing means 20102.

step 5105: The coding mode analyzing means 20101 determines the selected value as the coding mode of the macroblock corresponding to the output stream, and then outputs the determined coding mode to the coding mode judging means 205.

step 5106: The above-explained process operation is repeatedly carried out until the coding modes of all of the macroblocks for 1 picture are determined. When the coding modes of all macroblocks are determined, step 5107: the coding mode analyzing means 20101 counts a total number of macroblocks in the intra coding mode contained in the information of the macroblock coding mode stored in the coding mode storing means 20102. When the counted macroblock number of the intra coding mode is smaller than a certain value (for example, total number of all macroblocks within 1 block), step 5108: this coding mode analyzing means 20101 outputs the picture coding mode as the inter coding mode to the coding mode judging means 205.

step 5109: When the counted macroblock number of the intra coding mode becomes larger than, or equal to this value, the coding mode analyzing means 20101 outputs this picture coding mode as the intra coding mode to the coding mode judging means 205.

Among the above-described process operations of FIG. 4B, the process operations for acquiring the macroblock coding mode and determining the coding mode thereof (defined from step 5101 to step 5106) are identical to those of FIG. 4A except that the coding mode is stored in the coding mode storing means 20102. The process operations shown in FIG. 4B is featured by such that while the macroblock coding modes of the input stream for 1 picture are stored, the picture coding mode of the output stream is determined from the trend of the macroblock coding modes for 1 picture.

With execution of such a process operation, the coding mode of the MPEG-4 containing also the information about the intra/inter coding modes in the unit of the picture can be properly determined from the compressed video signal by the H.261-recommended format having no such information about the intra/inter coding modes in the unit of the picture with a small number of process operations.

Second Utilization Example of Added Information

Similar to the first utilization example of the added information, a second utilization example of the added information utilizes a coding mode. A major different point of this second utilization example of the added information is given as follows: In the first utilization example, the macroblock coding mode of the output stream owns the same value as that of the coding mode of the input stream. In contrast, in this second utilization example, a macroblock coding mode of an output stream may be set to a coding mode other than the coding mode of the input stream based upon a macroblock coding mode of a past frame of the output stream. As a result, in such a case that there is a difference in compression efficiencies because a compression format of an input stream is different from a compression format of an output stream, a coding mode is properly changed, so that a necessary compression rate may be secured while a deterioration in an image quality is kept low.

Figure 5:
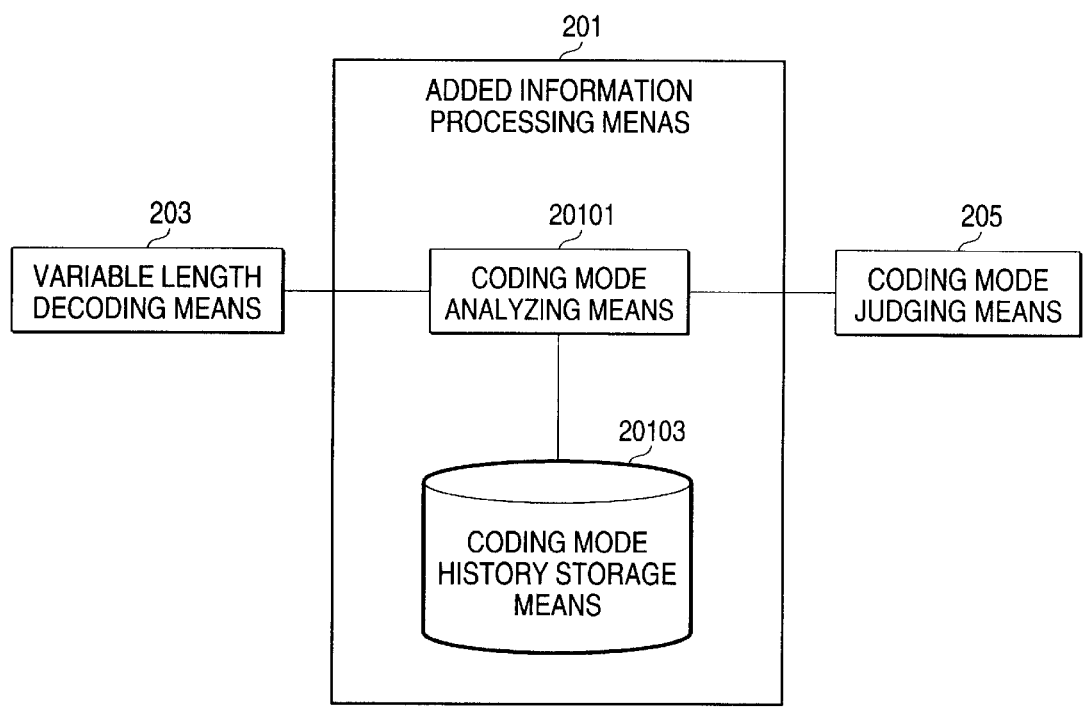
FIG. 5 is a functional block diagram of added information processing means having a function capable of producing/supplying coding mode history information.

FIG. 5 is a functional block diagram for indicating an internal arrangement of the added information processing means 201 used in this second utilization example. As indicated in FIG. 5, the added information processing means 201 for this second utilization example is featured by employing a coding mode history storing means 20103, as compared with the added information processing means 201 for the first utilization example.

The process operation executed in the added information processing means 201 for this second utilization example is realized by adding the process operations (see FIG. 3A) of the first added information processing unit 201 to a coding mode history storing process operation and a coding mode history referring process operation. Among these process operations, the explanations about the process operations similar to those of the first utilization example are omitted, and a detailed explanation will be made of both the coding mode history storing process operation and the coding mode history referring process operation.

Figure 6:
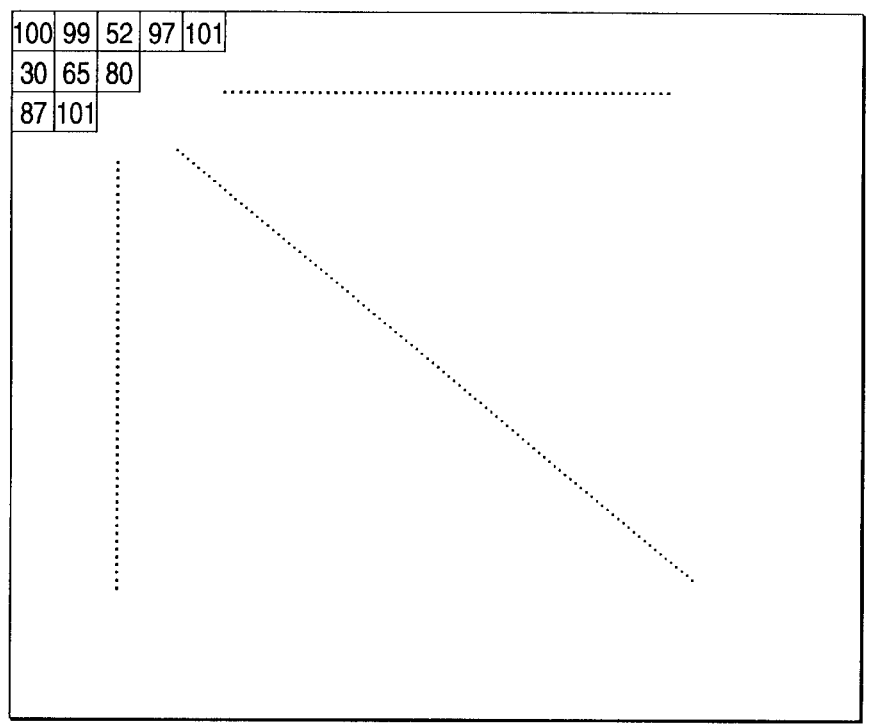
FIG. 6 is an image diagram for explaining a concept of the coding mode history information.

A first explanation will now be made of an example of coding mode history information in this second utilization example. The coding mode history information is such information for indicating how many microblocks for plural pictures are inter-coded after each of macroblocks within 1 picture has been intra-coded. This coding mode history information is stored in the coding mode history storage means 20103, and may be read, if required. FIG. 6 represents an example of the coding mode history information. As shown in FIG. 6, the coding mode history information is arranged by an array of numeral value information in which a total number of macroblocks within 1 picture constitutes an element number. Each of these numeral values indicates how many macroblocks for plural pictures are inter-coded after a macroblock located at a corresponding position has been finally intra-coded.

Now, a description will be made of the coding mode history information process operation.

Figure 7A:
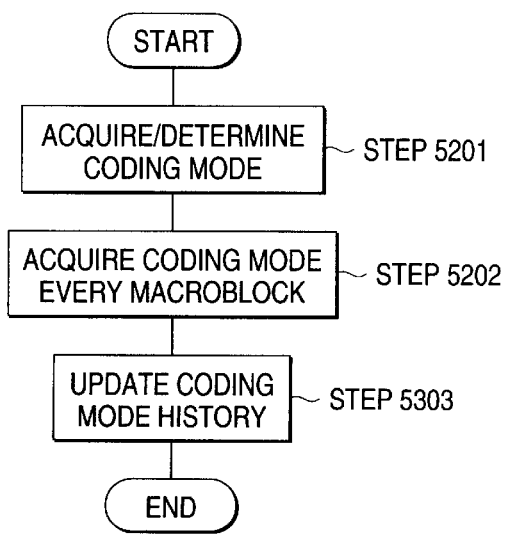
FIG. 7 is a flow chart for describing a producing/referring process operation of the coding mode history information.

This process operation is such a process operation which is executed subsequent to the coding mode acquiring/determining process operation (namely, process operation shown in FIG. 3A). In FIG. 7(A), there is shown a process flow operation including the coding mode acquiring/determining process operation. As indicated in FIG. 7(A), the coding mode history storing process operation is executed in accordance with the following flow operation:

step 5201: First, the coding mode analyzing means 20101 executes the coding mode acquiring/determining process operation shown in FIG. 3(A), and then outputs the coding mode as the process result to the coding mode judging means 205.

step 5202: Next, after the coding mode judging means 205 determines the coding mode when the output stream is actually coded, the coding mode analyzing means 20101 acquires this coding mode every macroblock.

step 5203: As to a macroblock to be inter-coded, the coding mode analyzing means 20101 increases the numeral value of the corresponding macroblock of the coding mode history information. As to a macroblock to be intra-coded, the coding mode analyzing means 20101 sets the numeral value of the corresponding macroblock of the coding mode history information to zero.

With execution of the above-explained process operation, the information for indicating how may pictures for plural pictures are inter-coded after the information has been finally intra-coded.

Figure 7B:
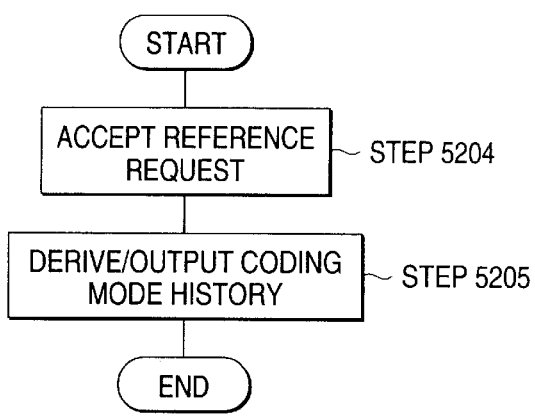

Next, a description will now be made of a process operation for referring to coding mode history information. The coding mode history referring process operation is explained. This coding mode history referring process operation is such a process operation that in response to a request issued from the coding mode judging means 205, the coding mode history information is supplied to the coding mode judging means 205. FIG. 7(B) is a flow chart for describing a process flow operation executed in the coding mode history referring process operation. As indicated in FIG. 7(B), this coding mode history referring process operation is executed in accordance with the below-mentioned process flow operation.

> step 5204: In response to a referring request of coding mode history information issued from the coding mode judging means 205, the coding mode analyzing means 20101 accepts this referring request in the unit of either a picture or a macroblock.
>
> step 5205: The coding mode analyzing means 20101 derives coding mode history information about the requested position from the coding mode history storing means 20103.
>
> step 5206: The coding mode analyzing means 20101 supplies the coding mode history information to the coding mode judging means 205.

In this case, a description will now be made of effects achieved by employing the coding mode history information. It is now assumed that a certain number of intra-coded macroblocks are contained in a certain picture of an input stream. Generally speaking, in the case that when all of the intra-coded macroblocks in the input stream are intra-coded also in the output stream, the coding amount is increased and thus cannot be limited by a predetermined bit rate, this video signal converting apparatus increases the entire quantizing scale to increase the compression rate, so that the coding amount may be limited to a predetermined bit rate. However, in this case, there is such a problem that since the compression rate of the entire macroblock is increased, the deterioration of the overall image would be increased. On the other hand, there is another general method. That is, in this method, since a total number of macroblocks to be intra-coded is reduced and a ratio of the inter-coded macroblocks having a high compression efficiency is increased, the resultant coding amount is suppressed. In accordance with this method, since the compression efficiency of the macroblocks is increased and a partial compression efficiency thereof is low, the reduction of the coding amount is realized. As a result, in general, the image quality of the entire picture to be intra-coded becomes better than that obtained by the previous coding method. However, there is another problem that if the inter-coding operation is continued for a long time period, errors occurred in the motion compensating operation are accumulated, which could induce large deterioration of the image quality.

As a consequence, if the coding mode history information produced in this second utilization example is utilized, then a selection is made of such macroblocks having a small picture number, which have been previously intra-coded and then are inter-coded, and these selected macroblocks can be changed into the inter-coded macroblocks. Thus, the image quality can be improved.

Also, in the case that the coding amount of the pictures in the output stream becomes largely lower than a predetermined bit rate, while referring to the coding mode history information, a selection is made of such macroblocks having a large picture number, which have been finally intra-coded and then are inter-coded, and these selected macroblocks are changed from the inter-coding mode into the intra-coding mode. As a result, while the deterioration of the image quality caused by the motion compensation is suppressed, the image quality can be improved.

As previously explained, in accordance with this second utilization example, the coding mode is determined by utilizing the coding mode information of the input stream. The determined coding mode is stored as the history information. Accordingly, it is possible to improve the image quality of the output stream without largely increasing the processing amount.

It should be understood that in this second utilization example, the process operation capable of processing only the macroblock unit within the first utilization example has been described. Alternatively, it is also possible to determine the coding mode in the macroblock unit and the coding mode in the picture unit by employing a method similar to that of this second utilization example.

Third Utilization Example of Added Information

A third utilization example corresponds to such a utilization example that a process amount of a motion prediction process operation required to code an output stream by utilizing a motion vector of an input stream can be reduced.

Figure 8:
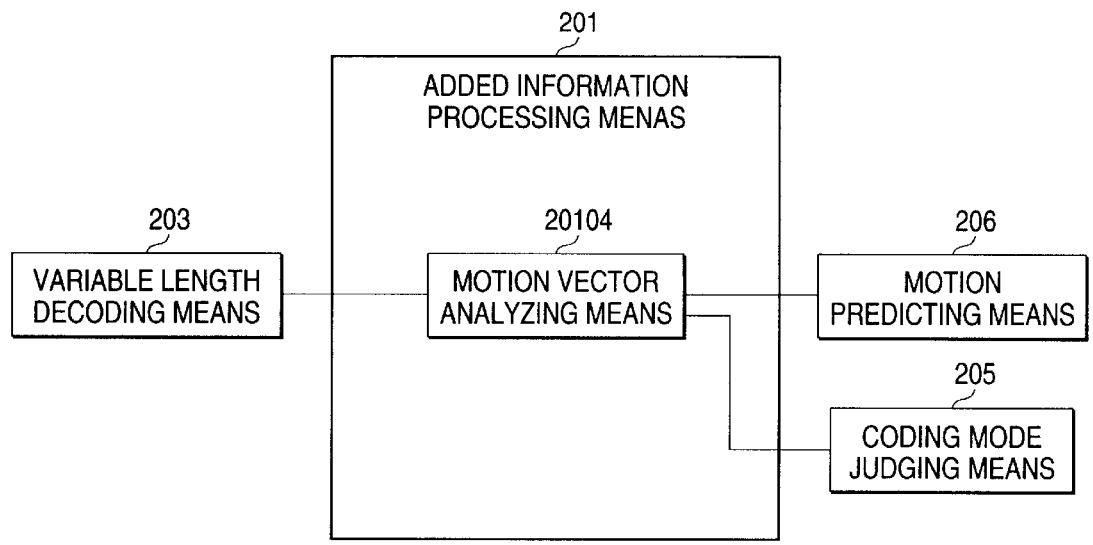
FIG. 8 is a functional block diagram of added information processing means by utilizing a motion vector of an input stream.

FIG. 8 is a functional block diagram for representing an internal arrangement of the added information processing means 201 which utilizes a motion vector of an input stream as added information. In FIG. 8, a motion vector analyzing means 20104 acquires the motion vector of the input stream, and selects/processes the acquired information as such information which may be utilized by the motion predicting means 206.

Figure 9:
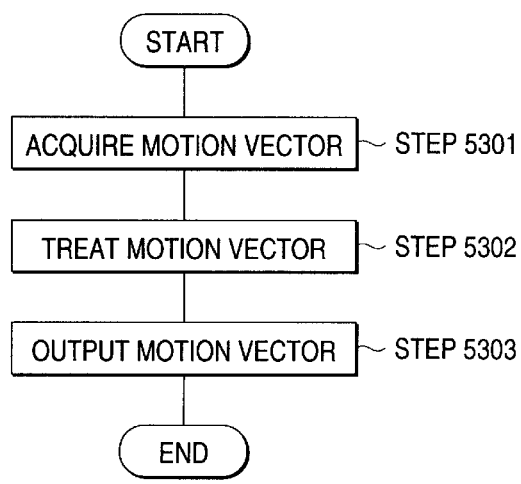
FIG. 9 is a flow chart for describing an added information processing operation by utilizing the motion vector of the input stream.

FIG. 9 is a flow chart for describing a process flow operation of the added information processing means 201 in this third utilization example. As indicated in FIG. 9, in this third utilization example, the motion vector information is utilized in accordance with the following process flow:

> step 5301: First, the motion vector analyzing means 20104 acquires a motion vector every macroblock from the variable length decoding means 203.
>
> step 5302: The motion vector analyzing means 20104 processes the acquired motion vector to obtain such information which can be utilized by the motion predicting means 206.
>
> step 5303: The motion vector analyzing means 20104 outputs the treated motion vector information to the motion predicting means 206. At the same time, this motion vector analyzing means 20104 outputs to the coding mode judging means 205, such information indicating that the coding mode of the relevant macroblock is the inter-coding mode.

Among these process operations, there are plural sorts of motion vector treating process operations (defined at step 5302) executed by the motion vector analyzing means 20104, depending upon formats of an input stream and of an output stream to be converted.

For instance, in the H.261-recommended format, there is such a motion prediction mode with a in-loop filter, which uses an image formed by processing a reference image by a low-pass filter so as to predict motion. However, this motion prediction mode is not conducted in the MPEG format such as the MPEG-4 format. As a consequence, when the input stream is the H.261-recommended format and the output stream is the MPEG-4 format, if the macroblock of the input stream is predicted by the motion prediction with the in-loop filter, then the motion vector analyzing means shifts the acquired motion vector along both the longitudinal and lateral directions by a half pixel to output such a pixel-shifted vector. This is because the motion vector shifted in the unit of a half pixel in the MPEG may be obtained by averaging the adjoining pixels to produce the reference image so as to predict the motion. As a result, a similar effect achieved by the in-loop filter in the H.261-recommended format can be essentially obtained.

Also, in the case that an image size of an input stream is different from an image size of an output stream, when a value of a motion vector of this input stream is directly employed, this vector value would have no meaning. In this case, if the motion vector is also enlarged/compressed at the same ratio as the enlarging/compressing ratio of the image size of the output stream with respect to the image size of the input stream, then the motion vector value of the input stream may be set to such a value which can be utilized in the motion prediction of the output stream.

Also, the following case happens to occur. That is, the motion vector information which has been processed in the above-explained manner may not be limited to a range of the motion vector of the output stream. In this case, in this third utilization example, the motion vector information is outputted in combination with such information for indicating that the relevant motion vector information cannot be directly utilized.

As previously explained, the motion vector analyzing means 20104 processes the acquired motion vector in accordance with the sort of the input/output streams.

The motion predicting means 206 determines a final motion vector of the output stream by utilizing the information about the motion vector outputted by the motion vector analyzing means 20104. There are two different sorts of methods for determining a final motion vector.

As the first determining method, the given motion vector information is directly used as the motion vector while the motion vector is not newly searched. In this case, only as to such motion vector information which cannot be directly utilized, another motion vector located within a range at the shortest distance from the given motion vector is used as the motion vector.

As the second determining method, while using a position of given motion vector information as a reference, a motion vector is searched to thereby acquire a final motion vector. In this case, as to such motion vector information which cannot be directly utilized, a motion vector is searched while using as a reference, a point within a range located at the shortest distance from the given motion vector information.

These two sorts of final motion vector determining methods own the following features. In general, the first determining method is featured by that the motion prediction process operation which, generally speaking, requires the largest process amount when the coding operation is carried out is completely deleted, and therefore, the process operation can be largely reduced. The second determining method is featured by that the motion prediction can be realized in higher precision by performing a small amount of motion searching process operation. Thus, the process operation can be reduced without deteriorating the image quality.

As previously explained, in this third utilization example, the following method has been described. That is, the macroblock having the motion vector in the input stream is inter-coded even in the output stream. As previously explained, when the acquired/processed motion vector information cannot be directly utilized, the coding mode of the relevant macroblock may be intra-coded. In general, when motion becomes very large, there are many possibilities that prediction errors thereof become large, and if such a macroblock is intra-coded without predicting motion, then the process amount can be largely deleted, and also the deterioration in the image quality can be reduced.

Fourth Utilization Example of Added Information

Similar to the third utilization example, a fourth utilization example is realized by that while a motion vector is utilized as added information, a motion prediction process operation executed during coding operation is reduced. A major different point of this fourth utilization example from the previous third utilization is given as follows. That is to say, when a motion vector is processed, a degree of accuracy (reliability) of motion vector information to be outputted is outputted, depending upon a magnitude of differential information of the relevant macroblock. As a result, a motion vector having a high degree of accuracy may be directly utilized without further predicting motion, and/or as to another motion vector having a low degree of accuracy, a motion vector may be searched while broadening a search range. Therefore, the process amounts can be more effectively distributed. A high image-quality conversion can be realized by using the same process amount.

Figure 10:
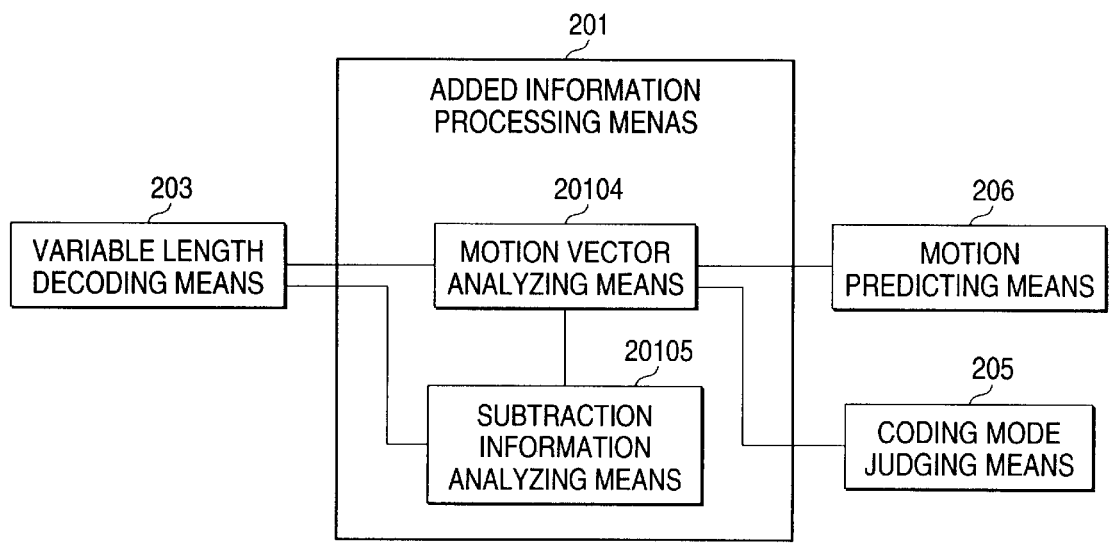
FIG. 10 is a functional block diagram of added information processing means by using the motion vector of the input stream and an accurate degree thereof.

FIG. 10 is a functional block diagram for showing an internal arrangement of the added information processing means 201 in this fourth utilization example. As apparent from FIG. 10, the internal arrangement of the added information processing means 201 according to this fourth utilization example is made by adding a subtraction information analyzing means 20105 to the above-explained added information processing means of the third utilization example. The subtraction information analyzing means 20105 acquires subtraction information corresponding to a motion vector of an acquired input stream, calculates a magnitude of this acquired subtraction information, and then outputs such information for indicating a degree of accuracy of a motion vector corresponding to the motion vector analyzing means 20104 in response to the calculation result.

Figure 11:
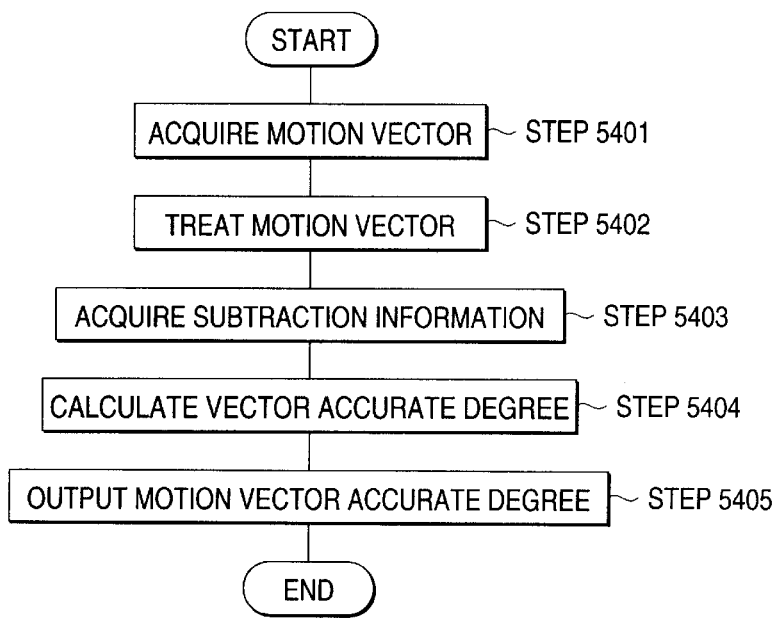
FIG. 11 is a flow chart for describing a added information process operation by using the motion vector and the input stream and the accurate degree thereof.

FIG. 11 is a flow chart for describing a process flow operation executed in the added information processing means 201 in this fourth utilization example. As indicated in FIG. 11, in this fourth utilization example, both a motion vector and subtraction information are utilized in the following process flow operations:

step 5401: First, the motion vector analyzing means 20104 acquires a motion vector every macroblock from the variable length decoding means 203.

step 5402: The motion vector analyzing means 20104 processes the acquired motion vector to obtain such information which can be utilized by the motion predicting means 206.

step 5403: The subtraction information analyzing means 20105 acquires subtraction information corresponding to the motion vector acquired by the motion vector analyzing means 20104.

step 5404: The subtraction information analyzing means 20105 calculates a degree of accuracy (accurate degree) of the corresponding motion vector from a magnitude of the acquired subtraction information, and then outputs the calculated accurate degree to the motion vector analyzing means 20104.

step 5405: The motion vector analyzing means 20104 outputs both the processed motion vector and the information of the corresponding accurate degree to either the motion predicting means 206 or the coding mode judging means 205.

A featured process operation of this fourth utilization example is such a process operation (defined at step 5404) for calculating the accurate degree of the motion vector from the subtraction information. Next, a concrete example of this calculating operation is indicated. The subtraction information contained in the input stream corresponds to such information obtained by DCT (discrete cosine transform)—transforming a subtraction component between a pixel value of the relevant macroblock and a pixel value of a macroblock of a reference image located at a position moved by the corresponding motion vector. In this fourth utilization example, this subtraction information is converted into a single value, and an accurate degree is determined by judging as to whether or not this value is smaller than a certain reference value. As this single value, there are two methods. That is, one method is to utilize a summation of absolute values of DCT coefficient values within a macroblock. The other method is to inverse-DCT-transform the subtraction information, and thereafter calculate an absolute value and a mean square error. Even when any one of these methods is employed, the larger the calculation result becomes, the lower the accurate degree of the vector becomes. Conversely, the smaller the calculation result becomes, the higher the accurate degree of the vector becomes.

A description will now be made of a utilization example of the accurate degree of this vector.

Figure 12:
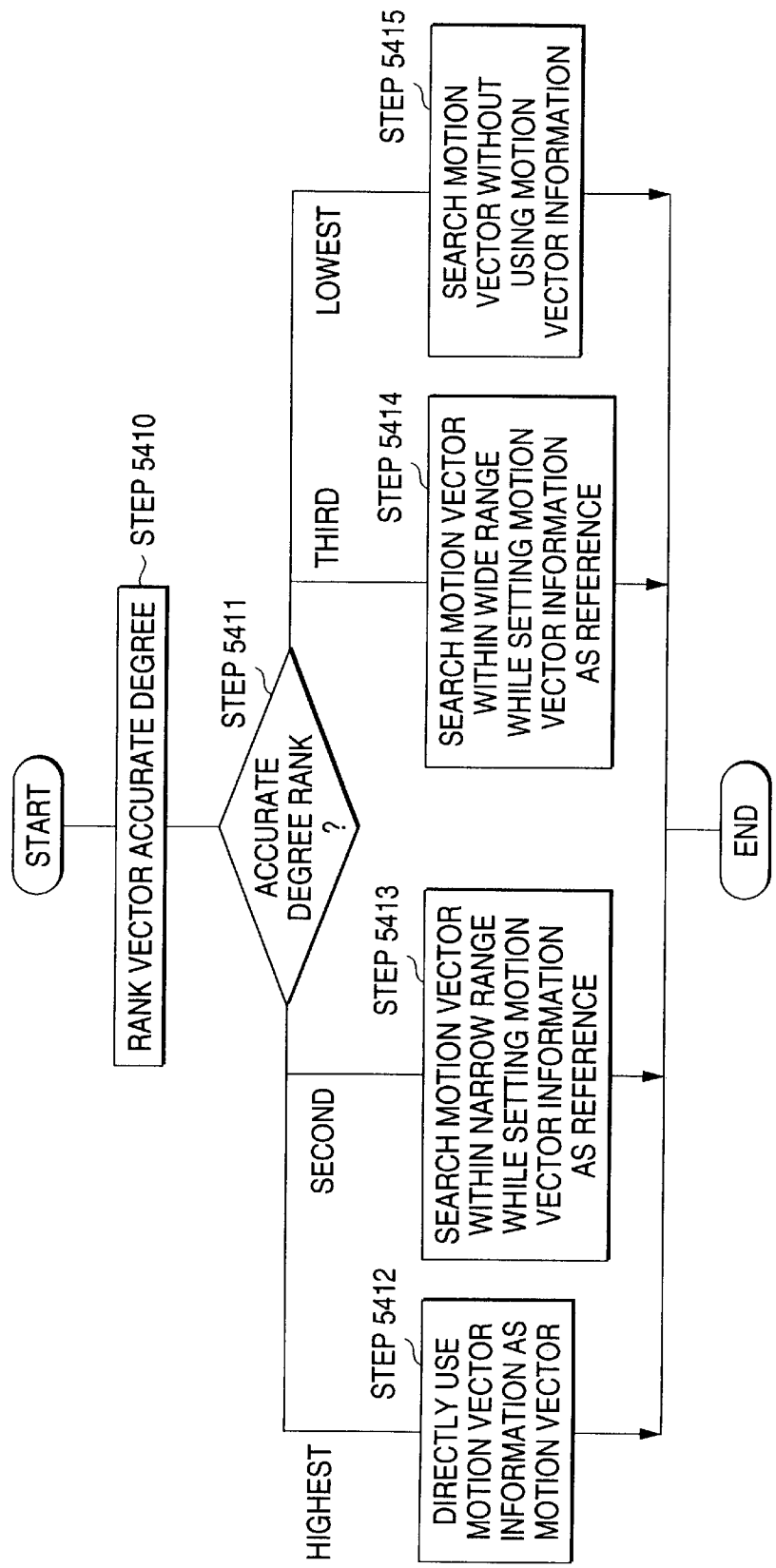
FIG. 12 is a flow chart for describing a motion predicting process operation adapted to the accurate degree of the motion vector of the input stream.

First, a description will now be made of a method for utilizing this accurate degree by the motion predicting means 206. The motion predicting means 206 subdivides a process operation into more than two sorts of process operations in response to the accurate degree of the vector. FIG. 12 is a flow chart for explaining an example of a motion predicting process operation in response to the accurate degree of the vector. In this fourth utilization example, the motion predicting means 206 utilizes the accurate degree of the vector as follows:

step 5410: The motion predicting means 206 classifies an accurate degree of a motion vector acquired by the added information processing means 201 into 4 ranks in accordance with a threshold value.

step 5411: When the rank of this accurate degree is the highest rank (namely, when the value of the acquired accurate degree is sufficiently small), step 5412: the motion predicting means 206 does not search the motion vector, but uses a motion vector which is acquired in combination with the accurate degree as an actual vector.

step 5413: When the rank of the accurate degree is the second highest rank, the motion predicting means 206 searches a motion vector within a narrow search range so as to search a motion vector while using the motion vector acquired in combination with the accurate degree as a reference motion vector.

step 5414: When the rank of the accurate degree is the third highest rank, the motion predicting means 206 searches a motion vector within a wide search range so as to search a motion vector while using the motion vector acquired in combination with the accurate degree as a reference motion vector.

step 5415: When the rank of the accurate degree is the lowest rank, the motion predicting means 206 newly searches a motion vector so as to acquire such a new motion vector without utilizing the motion vector acquired in connection with the accurate degree.

Since such a process operation is carried out, the limited calculation amount can be effectively allocated to the necessary process operation with employment of the accurate degree of the motion vector. As a result, the high image quality can be realized, although the same processing amount is merely required.

Figure 13:
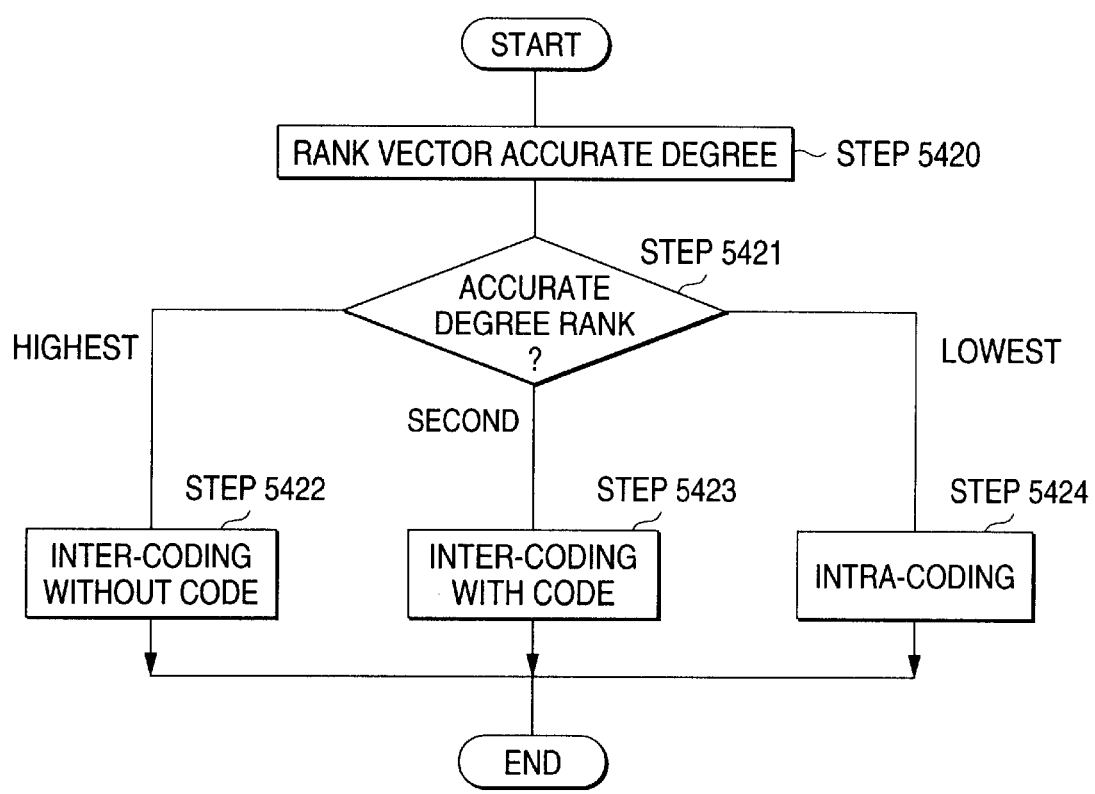
FIG. 13 is a flow chart for explaining a coding mode determining process operation adapted to the accurate degree of the motion vector of the input stream.

Next, a description will now be made of a method for utilizing this accurate degree by the coding mode judging means 205. The coding mode judging means 205 subdivides a coding mode into more than two sorts of coding modes in response to the accurate degree of the vector. FIG. 13 is a flow chart for explaining an example of a coding mode judging process operation in response to the accurate degree of the vector. In this embodiment, the coding mode judging means 205 utilizes the accurate degree of the vector as follows:

step 5420: The coding mode judging means 205 classifies an accurate degree of a motion vector acquired by the added information processing means 201 into 3 ranks in accordance with a threshold value.

step 5421: When the rank of this accurate degree is the highest rank (namely, when the value of the acquired accurate degree is sufficiently small), step 5422: the coding mode judging means 205 determines the coding mode of the corresponding macroblock as an inter-coded mode without any code (namely, mode having only motion vector but no subtraction information).

step 5423: When the rank of the accurate degree is the second highest rank, the coding mode judging means 205 determines the coding mode of the corresponding macroblock as an inter-coded mode with a code.

step 5424: When the rank of the accurate degree is the lowest rank, the coding mode judging means 205 determines the coding mode of the corresponding macroblock as an intra-coding mode.

Since such a process operation is carried out by employing the accurate degree of the motion vector, the coding mode judging means 205 can precisely judge the coding mode, while executing substantially no process operation.

Fifth Utilization Example of Added Information

In a fifth utilization example of added information, a description will now be made of such a utilization example that a delay occurred by a transforming process of a compression format may be largely reduced by using added information.

First, a basic idea of reducing a delay by way of this fifth utilization example will now be briefly described.

In general, the inter-frame compression format is used as moving picture compression formats including the H.261-recommended format and the MPEG-4 format. This compression format is performed in such a manner that a picture to be coded indicates a resembling position based on a motion vector from either a forward picture or a backward picture, and this picture together with a subtraction between the own picture and the relevant picture are coded. To perform this in-frame compression, at least pictures (intra-picture) constituting a reference, all of which are intra-frame-compressed, are required in the beginning.

On the other hand, in the H.261-recommended format, there are many conditions such that macroblocks which are partially intra-coded are mixed with an intra-frame-compressed picture. This picture cannot be utilized as the first reference picture to be coded. Since the H.261-recommended format does not contain such a code indicating that the entire picture is intra-coded due to the syntax thereof, the following confirmation is required in order to recognize that the overall picture has been intra-coded. That is, the coding modes of all of the microblocks contained in the picture are acquired, and it is required to confirm that all of the acquired coding modes are equal to the intra-coding mode. As a consequence, in order to commence the coding process operation after detecting the intra-picture, this coding process operation cannot be started unless after all of the codes for at least 1 picture have been acquired. Therefore, in principle, a delay occurs which is caused by the process operation for at least 1 picture.

In accordance with this fifth utilization example, while the coding mode history information used in the second utilization example is expanded, the basically-caused process delay is reduced up to 1 macroblock by employing the below-mentioned method. This process delay reducing method may be realized by executing the following process operation in the unit of the macroblock without storing an input stream for 1 picture, which should be transferred/coded. This process operation is to detect a first intra-picture when the input stream to be transferred/coded is entered into this apparatus. In other words, in this fifth utilization example, until a first intra-picture contained in an input stream is detected, all of macroblocks of an output stream are intra-coded irrespective of such a fact as to whether or not each macroblock of the input stream is actually intra-coded. Then, the actual coding mode of the input stream is stored in the unit of 1 picture. Then, when the entry of the input stream for 1 picture and the production of the output stream are accomplished, a judgement is made as to whether or not the processed picture corresponds to an intra-picture.

A description will now be made of an internal arrangement of the added information processing means 201 and operations thereof, which executes the above-explained process operation in this fifth utilization example. The internal arrangement of the added information processing means 201 in this fifth utilization example is similar to that of the second utilization example, and is indicated by the functional block diagram of FIG. 5. Also, a process flow operation by the added information processing means 201 when the normal coding operation is carried out is similar to that of the second utilization example, and is indicated in FIG. 4 and FIG. 7. Accordingly, in this fifth utilization example, an intra-picture detecting process operation which constitutes a feature of this fifth utilization example will now be explained in detail.

A data structure of coding mode history information used in this fifth utilization example is identical to that of the coding mode history information of the second utilization example. Only a different point between these second and fifth utilization examples is given as follows. That is, in the second utilization example, the possible values of the respective elements of the coding mode history information are only positive numbers. To the contrary, in this fifth utilization example, these possible values are also negative numbers. It should be noted that in the case of a negative number, this negative number does not own a similar meaning to that of a positive number, but is utilized as one sort of code indicative of such a condition of a coding mode of each macroblock. As a consequence, as this negative number, any values may be employed. In this fifth utilization example, two sorts of negative numbers are employed, namely "−1" and "−2".

Figure 14:
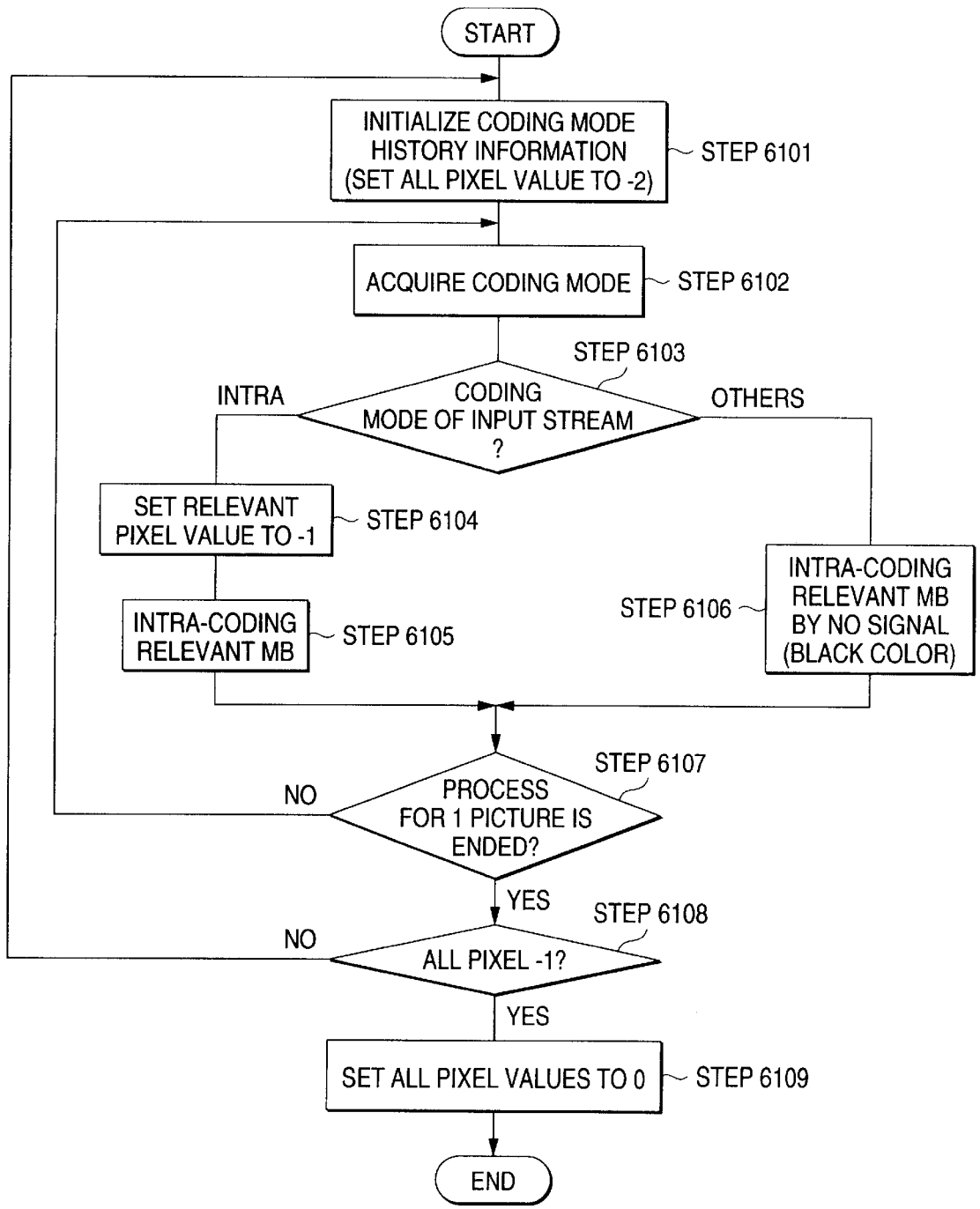
FIG. 14 is a flow chart for explaining an intra-picture detecting process operation capable of realizing a low process delay.

FIG. 14 is a flow chart for describing a process flow operation of the intra-picture detecting process operation executed in this fifth utilization example. As shown in FIG. 14, the intra picture is detected in accordance with the following flow operation in this fifth utilization example.

step 6101: First, the coding mode analyzing means 20101 sets values of all elements of the coding mode history information to initial values ("−2").

step 6102: Next, the coding mode analyzing means 20101 acquires a coding mode of an input stream in the unit of a macroblock from the variable length decoding means 203.

step 6103: If the acquired coding mode is equal to the intra-coding mode, step 6104: the coding mode analyzing means 20101 sets the value of the relevant pixel of the coding mode history information to an intra-coded value ("−1").

step 6105: The coding mode judging means 205 and the means used in the subsequent coding operation intra-codes the relevant macroblock.

step 6106: When the acquired coding mode is not equal to the intra-coding mode, the coding mode judging means 205 and the means used in the subsequent coding operation intra-codes the relevant macroblock as a block of no signal (for example, entire macroblock is black color).

step 6107: If the intra-picture detecting process operation for 1 picture is not yet accomplished, then a similar detecting operation is carried out as to the next macroblock (namely, process operation is returned to step 6102).

step 6108: Conversely, if the intra-picture detecting process operation for 1 picture has been ended, then the coding mode analyzing means confirms as to whether or not the values of all elements of the coding mode history information have become the intra-coded values ("−1"). If not, then a similar process operation is carried out as to the next picture (namely, process operation is returned to step 6101).

step 6109: When the values of all elements of the coding mode history information have been set to the intra-coded values ("−1"), since the processed picture corresponds to the intra-picture within the input stream, the values of all elements of the coding mode history information are set to "0", and then the normal coding process operation is carried out. Namely, the process operations defined in FIG. 4 and FIG. 7 are carried out.

It should be noted that when the output stream such as the MPEG-4 format is required to set the coding mode in the unit of the picture, since all of the macroblocks are intra-coded while performing the above-explained intra-picture detecting operation, the picture coding mode is continuously set to the intra-coding mode.

Since the above-explained process operations of this fifth utilization example are carried out, the process delays for more than 1 picture which are conventionally induced in the compression format transforming process operation can be basically reduced up to the process delays for 1 macroblock.

As previously described, in accordance with this first embodiment, the output stream is produced by utilizing the added information having the input stream. As a result, the calculation amount can be reduced, the deterioration in the image quality when the output stream is produced can be reduced, and furthermore, the process delays required to execute the stream transforming process operation can be reduced.

It should also be noted that the H.261-recommended format is employed as the input stream and the MPEG-4 format is used as the output stream in this embodiment. Alternatively, as apparent from the explanations of this first embodiment, the process operations and the arrangement of the apparatus as explained in this first embodiment may be readily applied to even such a case that both the input stream and the output stream are compressed by other different formats.

Second Embodiment

In this second embodiment, a video signal converting apparatus will now be explained. This video signal converting apparatus converts a video signal which is compressed by the H.261-recommended format into a video signal which is compressed by the MPEG-4-visual format. It should be understood that the video signal converting apparatus according to this second embodiment is functionally equal to the video signal converting apparatus as previously explained in the first embodiment. A feature of the video signal converting apparatus according to the second embodiment is to own such a function capable of using a DCT (discrete cosine transform) coefficient contained in an input stream without being inverse-DCT transformed.

Figure 15:
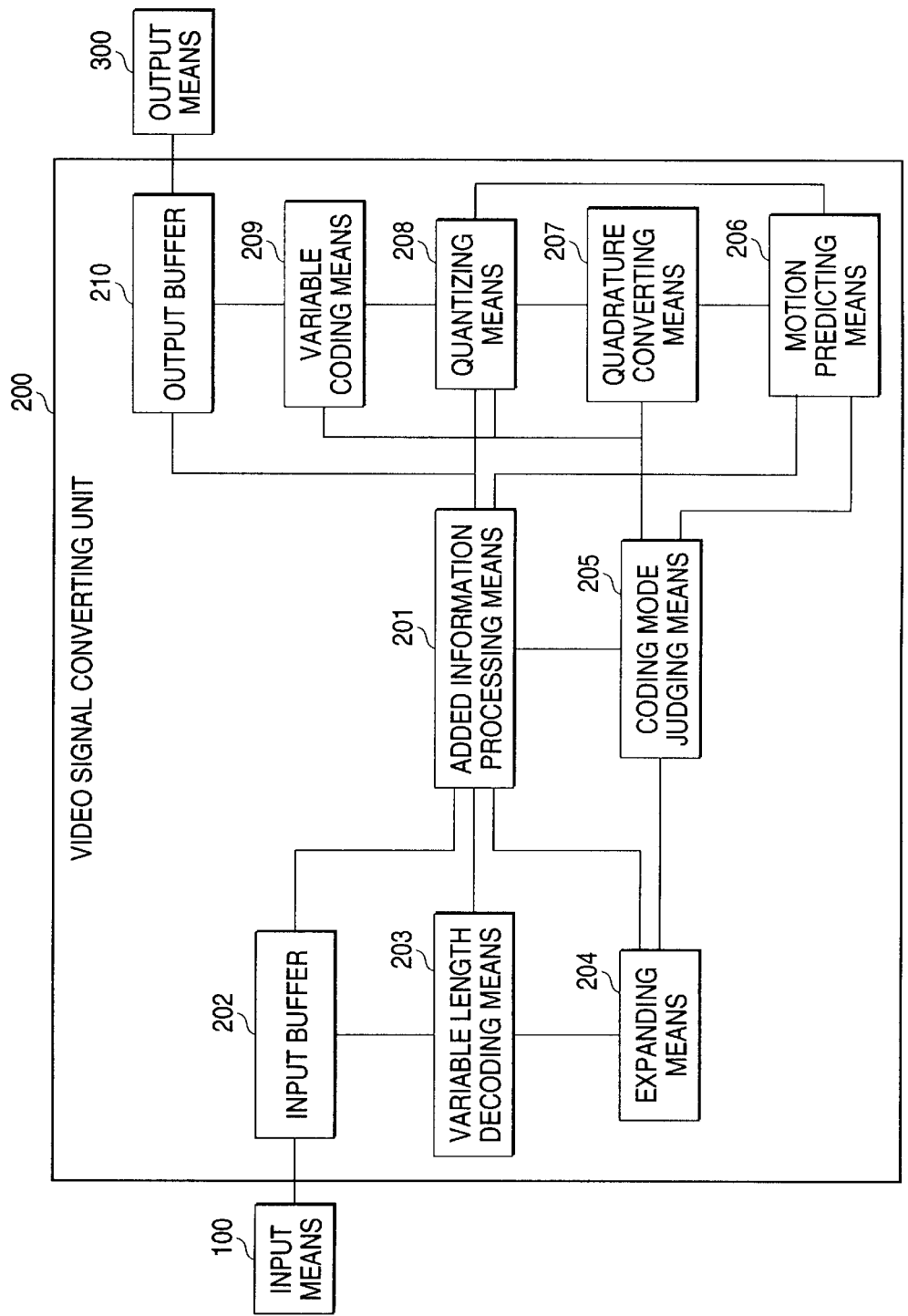
FIG. 15 is a functional block diagram of a video coding apparatus for coding macroblocks by using a quadrature converting coefficient of an input stream.

First of all, an arrangement of this video signal converting apparatus according to the second embodiment will now be explained. FIG. 15 is a functional block diagram of this video signal converting apparatus. The arrangement of this second video signal apparatus shown in FIG. 15 is substantially identical to that of the video signal converting apparatus according to the first embodiment, shown in FIG. 1. The second video signal converting apparatus owns the following different point from that of the first video signal converting apparatus. That is to say, the added information processing means 201 employed in this second video signal converting apparatus is newly connected to the expanding means 204, the quantizing means 208, and the variable length coding means 209.

Figure 16:
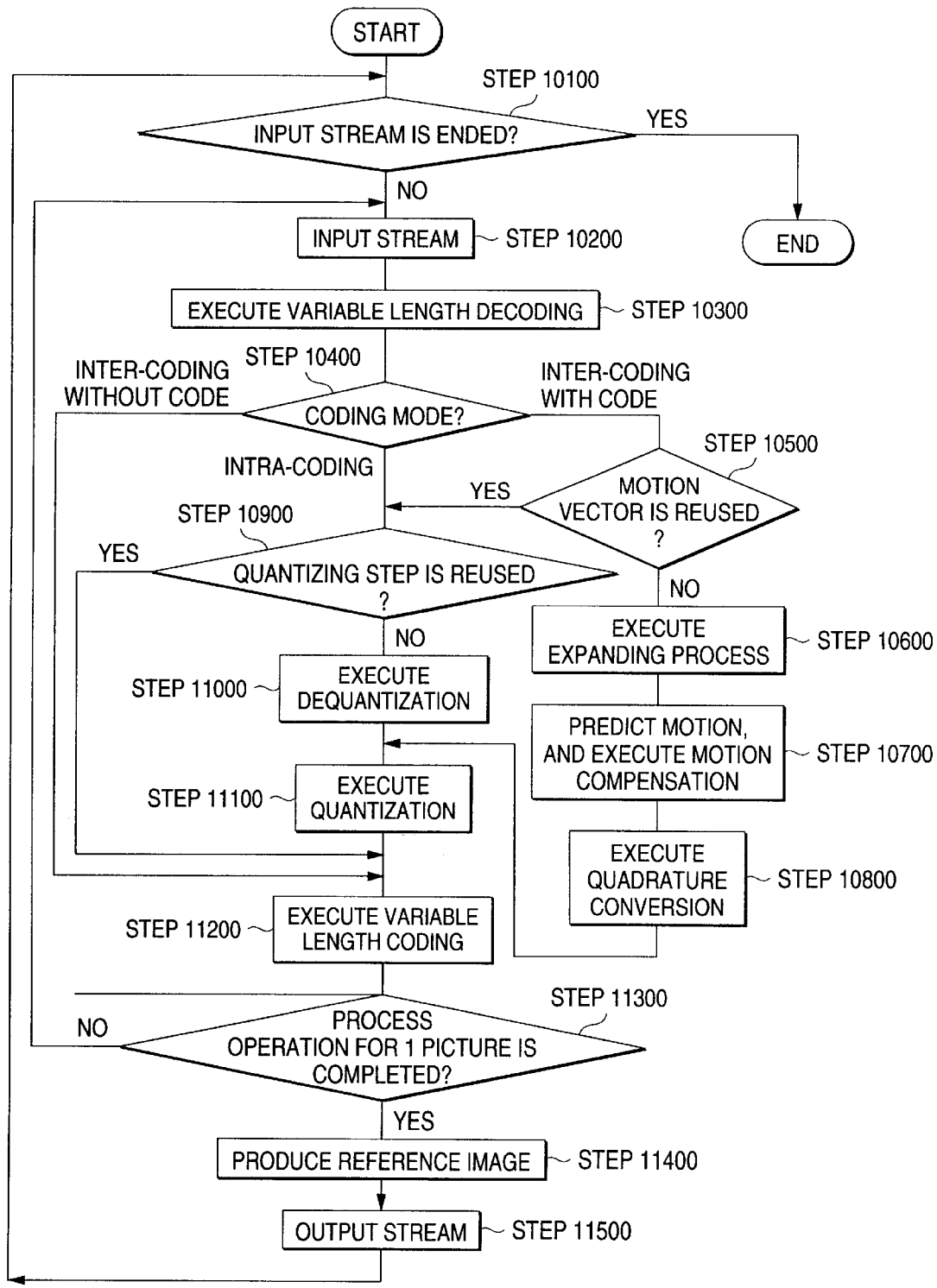
FIG. 16 is a flow chart for explaining a process operation of the video coding apparatus for coding the macroblocks by using the quadrature converting coefficient of the input stream.

Next, as to an overall process operation by this second video signal converting apparatus, a basic process flow operation will now be explained with reference to a flow chart shown in FIG. 16. The process operation shown in FIG. 16 is a process operation in such a case that the DCT coefficient of the input stream is utilized in a maximum efficiency, which constitutes a featured point of this second video signal processing apparatus. The process operation explained in this second embodiment may be readily combined with the various process operations executed in the video signal converting apparatus as explained in the first embodiment.

In the case that the DCT coefficient of the input stream is reused in a maximum efficiency by the second video signal converting apparatus, as indicated by the flow chart of FIG. 16, this video signal converting apparatus executes the converting (transforming) process operation of the compressed video signal in accordance with the below-mentioned flow operations:

step 10100: When there is an input stream which is not yet processed, step 10200: the input means 100 inputs the input stream which is not yet processed into the input buffer 202.

step 10300: The variable length decoding means 203 sequentially derives the input streams from the input buffer, and then variable-length-decodes the derived input stream by way of a method according to the coding regulation of the input stream, and supplies the coding mode among the decoded input streams to the added information processing means 201.

step 10400: The added information processing means 201 refers to the coding mode supplied from the variable length decoding means 203, and if the decoding mode is equal to the inter-coding mode, step 10500: then the added information processing means 201 acquires a motion vector of the relevant macroblock from the variable length decoding means 203.

When the acquired motion vector is such a value which can be directly reused to the output stream, step 10600: the expanding means 204 executes the expanding process operation involving the dequantization of the DCT coefficient, the inverse DCT, and the motion compensation to thereby recover the image.

step 10700: The motion predicting means 206 newly predicts the motion and compensates the motion to thereby produce a motion vector and subtraction information.

step 10800: The quadrature converting means 207 DCT-transforms the produced subtraction information to thereby produce the DCT coefficient.

step 10900: In the case that since the macroblock of the interstream is inter-coded, the motion vector can be directly reused, and also the macroblock is intra-coded, a judgement is made as to whether or not the quantized value of the macroblock of the input stream is such a value which can be directly reused. If the quantized value of the macroblock of the input stream is such a value which cannot be reused, step 11000: the expanding means 204 dequantizes the quantized DCT coefficient so as to recover the DCT coefficient.

step 11100: The added information processing means 201 acquires the recovered DCT coefficient, and then supplies the acquired DCT coefficient to the quantizing means 208. Then, the quantizing means 208 quantizes the supplied DCT coefficient.

step 11200: The variable length coding means 209 variable-length-codes the quantized VCT coefficient, and also the motion vector if this motion vector is present.

step 11300: A similar process operation is repeatedly carried out until the converting process operations of all of the macroblocks for 1 picture are accomplished (namely, process operation is returned to step 10200). If the converting process operations of the macroblocks for 1 picture are completed, step 11400: then the motion predicting means 206 produces a reference image from a coded present picture so as to code a subsequent picture.

step 11500: Finally, the output means 300 derives an output stream from the output buffer 210 to output the derived output stream (namely, process operation is returned to step 10100).

Next, a description will now be made of a process operation of this video signal converting apparatus in such a case that while DCT coefficients are quantized, either an input stream or an output stream is quantized based upon different quantizing values, depending upon positions of the respective DCT coefficients within a DCT block. When DCT coefficients are quantized based upon the H.261-recommended format, all of the DCT coefficients within a single DCT block are quantized based upon the same quantizing value. On the other hand, in the MPEG-1 format the MPEG-2 format, and the MPEG-4 format, all of DCT coefficients within a single DCT block may be quantized based upon different quantizing values. In the MPEG format, a ratio of quantizing values to the respective DCT coefficients with respect to a quantizing scale is expressed as a quantizing matrix. Then, this quantizing matrix may be arbitrarily set when a coding operation is carried out.

As a result, in this video signal converting apparatus, in the case that a quantizing matrix (otherwise information corresponding to quantizing matrix) can be arbitrarily set, a quantizing value of an input stream can be directly used by reusing a quantizing matrix (otherwise information corresponding to quantizing matrix), which is like an MPEG format.

Figure 17:
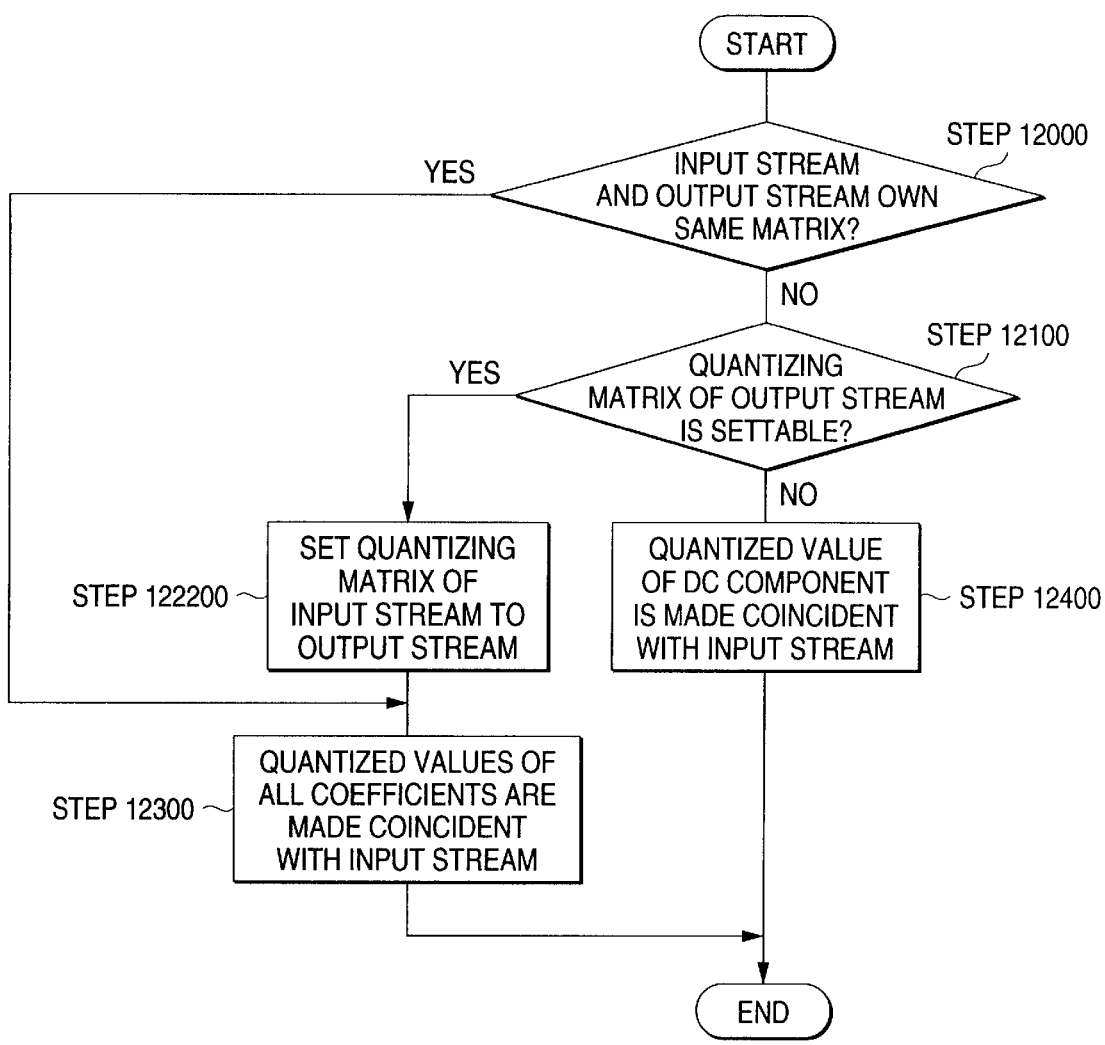
FIG. 17 is a flow chart for describing an algorithm used to determine a method for using a quantizing value of the input stream.

FIG. 17 is a flow chart for explaining an algorithm used to determine a quantizing value of an output stream, and also a quantizing matrix when this quantizing matrix can be set.

It should be understood that in this second embodiment, all of information equivalent to the quantizing matrix in the MPEG format will be referred to as a "quantizing matrix."

As indicated in FIG. 17, this video signal converting apparatus determines both a quantizing value and a quantizing matrix in accordance with the below-mentioned flow operation:

step 1200: The video signal converting unit 200 checks as to whether or not a quantizing matrix of an input stream is identical to a standard quantizing matrix of an output stream. If the quantizing matrix of the input stream is identical to the standard quantizing matrix of the output stream, the video signal converting unit 200 uses the standard quantizing matrix as the quantizing matrix of the output stream.

step 12100: When the quantizing matrix of the input stream is not identical to the standard quantizing matrix of the output stream, if the quantizing matrix of the output stream is variable, step 12200: the video signal converting unit 200 determines that the quantizing matrix of the output stream is made identical with the quantizing matrix of the input stream.

step 12300: In such a case that the quantizing matrix of the input stream is made identical to that of the output stream, the video signal converting unit 200 determines the quantizing values of the block in such a manner that the quantizing values with respect to all of the coefficients within the block are equal to each other.

step 12400: When the quantizing matrix of the input stream is not identical to the quantizing matrix of the output stream, the video signal converting unit 200 determines the quantizing value of the block in such a manner that the quantizing values of the DC components among the DCT coefficients are made equal to each other.

It should be noted that the quantizing values may be varied in accordance with the general algorithm for controlling the quantizing value in the following case. That is, when the quantizing/coding operation are carried out based upon the quantizing matrix and the quantizing value determined by the above-explained algorithm, the coding amount of the output stream becomes larger than the target coding amount.

As previously explained, this video signal converting apparatus can largely reducing the total processing operations for the DCT transform, the inverse DCT transform, the quantization, and the dequantization, so that the video signal can be converted in high speeds. Furthermore, as to the intra-coded macroblocks, both the inverse DCT transform and the DCT transform are not executed during the intermediate process step, and also the quantization is not again carried out. As a result, the errors caused by performing the DCT transform and the quantization can be reduced, and the high quality image can be obtained.

It should also be noted that the H.261-recommended format is employed as the input stream and the MPEG-4 format is used as the output stream in this embodiment. Alternatively, as apparent from the explanations of this second embodiment, the process operations and the arrangement of the apparatus as explained in this second embodiment may be readily applied to even such a case that both the input stream and the output stream are compressed by other different formats.

Third Embodiment Mode

In this third embodiment, a video signal converting apparatus will now be explained. This video signal converting apparatus converts a video signal which is compressed by the H.261-recommended format into a video signal which is compressed by the MPEG-4-visual format. It should be understood that the video signal converting apparatus according to this third embodiment may achieve a specific effect in the case that a video signal having an image size known as a CIF (Common Interface Format) is used as either an input stream or an output stream. The video signal converting apparatus according to this third embodiment is similar to the above-explained video signal converting apparatus according to the first embodiment. However, this third embodiment owns the following different point. That is, any one of the input stream and the output stream, or both the these input/output streams use the image size of the CIF.

A first description will now be made of a macroblock structure within 1 picture when an image having an image size of CIF is coded by way of the H.261-recommended format and the MPEG-4-visual simple profile format (will be referred to as an "MPEG-4 format").

Figure 18:
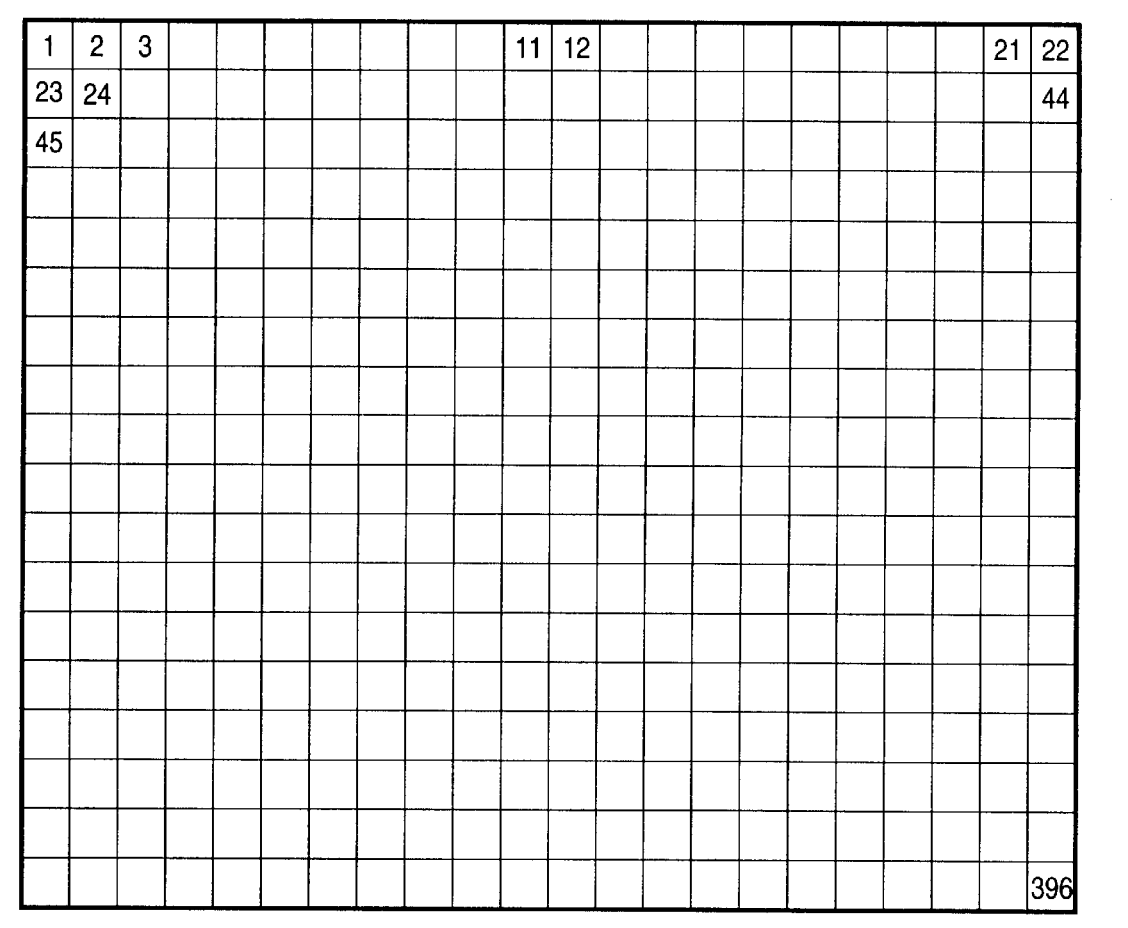

First of all, the macroblock structure in the MPEG-4 format will now be described. FIG. 18 is a diagram for representing macroblocks contained in 1 picture having a CIF image size, and a coding order of these macroblocks in the case that the macroblocks are coded by the MPEG-4 format. A minimum region surrounded by a dotted line of FIG. 18 indicates a single macroblock. In other words, 396 pieces of macroblocks constituted by 22 macroblocks (longitudinal direction)×18 macroblocks (lateral direction) are contained in 1 picture having an image size of CIF. Also, numerals appearing in the macroblocks shown in FIG. 18 indicate orders by which the relevant macroblocks are coded in the pictures. As apparent from FIG. 18, in accordance with the MPEG-4 format, the macroblocks are coded in this order from an upper left end to a right direction.

Next, the macroblock structure in the H.261-recommended format will now be described. FIG. 19 is a diagram for representing macroblocks contained in 1 picture having a CIF image size, and a coding order of these macroblocks in the case that the macroblocks are coded by the H.261-recommended format. Also, in the H.261-recommended format, a total number of macroblocks contained in 1 picture having an image size of CIF is equal to that of the MPEG-4 format. However, the coding order used in the H.261-recommended format is different from that used in the MPEG-4 format. A minimum region surrounded by a dotted line of FIG. 19 indicates a single macroblock. Also, a laterally-elongated region surrounded by a solid line within a picture represents a GOB (Group Of Block). As apparent from FIG. 19, 33 pieces of macroblocks are contained in each of GOBs. 12 pieces of GOBs are contained in 1 picture. In accordance with the H.261-recommended format, macroblocks are coded in the unit of GOB. In other words, coding orders of macroblocks are established in such a manner that after macroblocks contained in one GOB are continuously coded, macroblocks contained in the next GOB are continuously coded. Concretely speaking, in FIG. 19, the GOB symbolized as "A" is firstly codeded, and the remaining GOBs are successively coded in this order of an alphabet, and finally, the GOB symbolized as "L" is coded. As apparent from the GOB symbolized as "A" of FIG. 19, the macroblocks contained in the respective GOBs are sequentially coded from the upper left end to the right direction, and the macroblock (lower right end) contained in the GOB symbolized as "L" is coded.

As a result, for instance, in such a case that an image size of an input stream and also an image size of an output stream own the CIF sizes, codes for 1 macroblock are entered, and at the same time, a compression format of this macroblock cannot be converted and the converted compression format cannot be outputted.

In this third embodiment, a utilization example of added information will be explained. This utilization example is useful in the compression format conversion from the H.261-recommended format into the MPEG-4 format in the image data having the CIF image size, and contains the above-explained feature.

Sixth Utilization Example of Added Information

In a sixth utilization example of added information, a description will now be made of such a video coding apparatus that a delay occurred by a transforming process of a compression format may be largely reduced by using added information.

A basic idea of reducing a delay by way of this sixth utilization example is identical to the basic idea of reducing the process delay in the video converting apparatus as shown in the fifth utilization example according to the first embodiment. This video coding apparatus owns the following different point from the above-explained video signal converting apparatus. That is, even in such a case that coding orders of macroblocks contained in a picture are different from each other between an input stream and an output stream, this video coding apparatus is equipped with a process operation and means, which can realize a process delay less than 1 picture.

Figure 20:
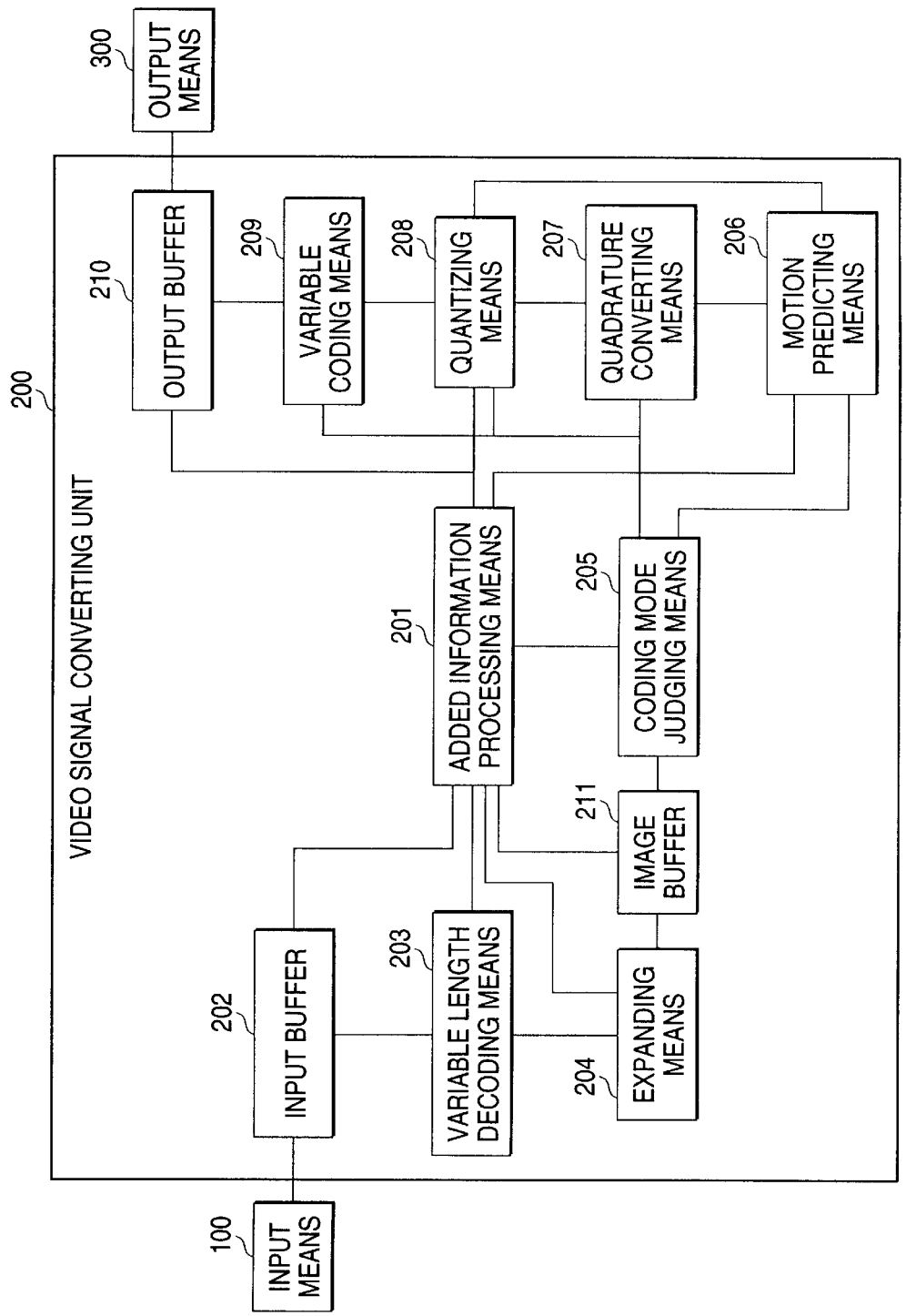
FIG. 20 is a functional block diagram of a video coding apparatus for converting formats of macroblocks with different coding orders by a low delay.

First, an internal arrangement of the video coding apparatus will now be explained. FIG. 20 is a functional block diagram for indicating the internal structure of this apparatus. As apparent from FIG. 20, the structural arrangement of this video coding apparatus is similar to the structural arrangement of the video signal converting apparatus according to the first embodiment. A structural different point of this video coding apparatus is given by that an image buffer 211 is provided in the video signal converting unit 200. The function of the image buffer 211 is as follows: This image buffer 211 stores thereinto information of a macroblock of an input stream which is supplied from either the expanding means 204 or the added information processing means 201. The image buffer 211 supplies the stored information of the macroblocks to either the coding mode judging means 205 or the added information processing means 201 in such an order required to produce an output stream.

Next, a process operation of this video coding apparatus will now be explained. The major process operation of this video coding apparatus is identical to that of the apparatus indicated in the fifth utilization example of the added information according to the first embodiment. A main different point of this video coding apparatus is featured by that a difference in coding orders of macroblocks is absorbed by the process operation executed in the image buffer 211. Therefore, in this sixth utilization example, a detailed explanation will now be made of such a process operation that the image buffer 211 stores thereinto macroblocks of an input stream and also outputs the stored macroblocks of the input stream.

Figure 21:
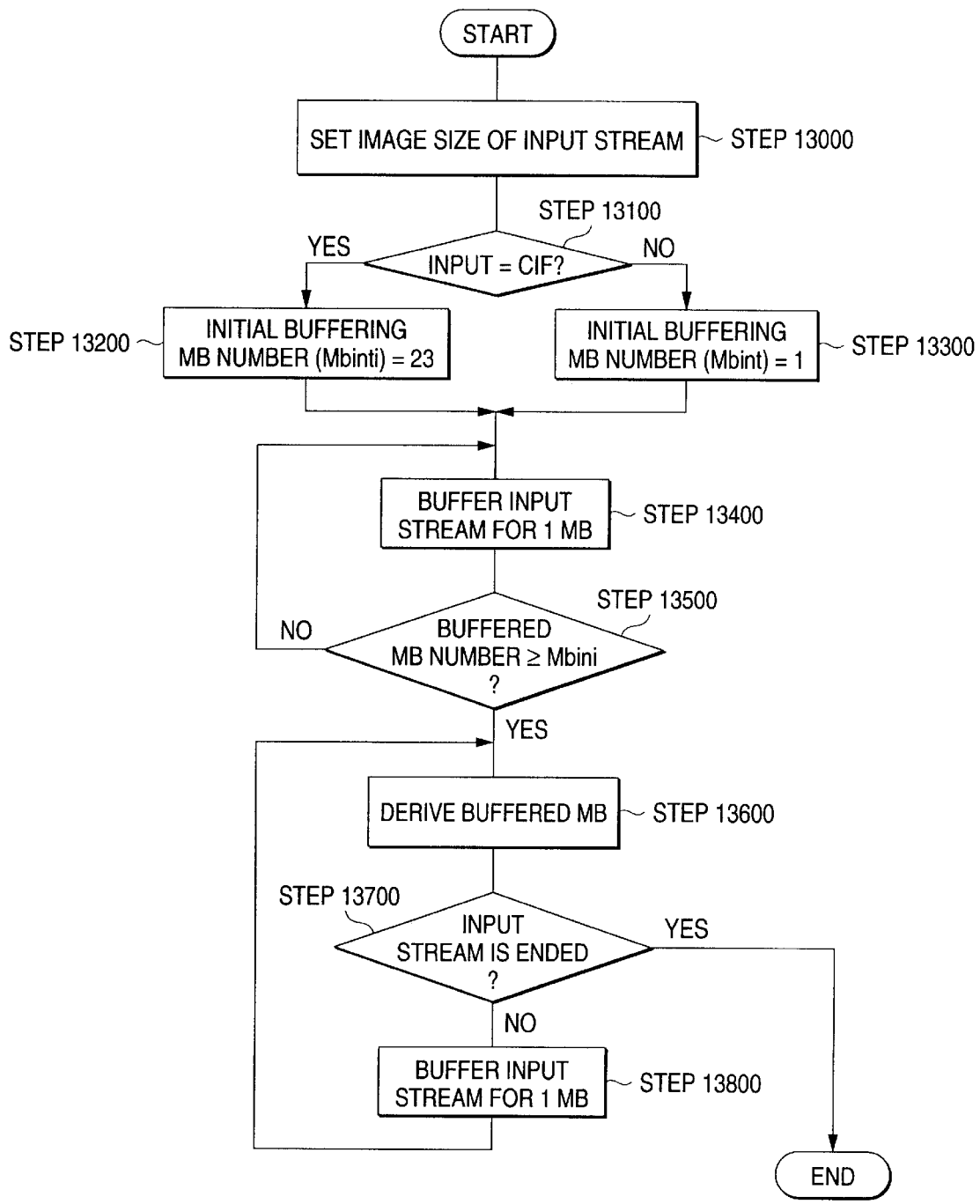
FIG. 21 is a flow chart for explaining a process flow operation of an image buffer.

FIG. 21 is a flow chart for showing a process flow operation of the image buffer 211 employed in this video coding apparatus. As indicated in FIG. 21, the image buffer 211 executes a process flow operation as flows:

step 1300: When this image coding apparatus commences the compression format converting operation with respect to a certain input stream, the image buffer 211 first acquires an image size of this input stream via the added information processing means 201.

step 13100: If the image size of this acquired input stream is equal to the CIF image size, step 13200: then the image buffer 211 determines a total number (MBinit) of macroblocks as 23, which are buffered before commencing a production of an output stream. In other words, this buffer 211 determines such a number by adding 1 to a total number of macroblocks contained in 1 picture along a lateral direction.

step 13300: When the image size of the input stream is not equal to the CIF size, but the QCIF size, the image buffer 211 determines the macroblock number "MBinit" as 1.

step 13400: Then, the image buffer 211 stores thereinto either a decoded image of the input stream or information about the image under decoding operation in the unit of the macroblock, which is entered from either the expanding means 204 or the added information processing means 201.

step 13500: If a total number of the macroblocks stored in the image buffer 211 becomes larger than, or equal to the macroblock number "MBinit", step 13600: then the image buffer 211 supplies the stored macroblocks to either the added information processing means 201 or the coding mode judging means 205 in the decoding order of the output stream.

step 13700: Then, until entry of the input stream is ended, the image buffer 211 buffers the information of the input stream in the unit of the macroblock, and step 13800: repeats supplying the buffered input stream information (namely, process operations defined from step 13600 are repeatedly performed).

It should be understood that in this third embodiment, the input stream is compressed in the H.261-recommended format whereas the output stream is compressed in the MPEG-4 format. Alternatively, the above-described process operation of the image buffer 211 may be carried out in a similar manner even in such a case that the compression formats for the input stream and the output stream are reversed while involving the macroblock number "MBinit".

As previously explained, in accordance with this sixth utilization example of the added information, the principle process delay can be considerably shorten, as compared with the conventional 1 picture, even in such a format conversion that the coding orders of the macroblocks are different from each other.

Seventh Utilization Example of Added Information

In a seventh utilization example, a description will now be made of a video coding apparatus capable of reducing a process amount of a judging process operation for a coding mode of each macroblock by utilizing added information.

A method for judging a coding mode executed in this seventh utilization example is such a judging method performed by utilizing a coding mode of an input macroblock corresponding thereto. This judging method is similar to the first to second utilization examples of the added information according to the first embodiment. A major different point of this seventh utilization example from the utilization examples described in the first embodiment is given as follows. Even in such a compression format converting operation between streams having different sizes, for instance, an input stream is a CIF size and an output stream is a QCIF size, a coding mode can be effectively judged. Accordingly, in this seventh utilization example, the sizes of the streams are given as follows. That is, the input stream is the H.261-recommended format of the CIF size, and the output stream is the MPEG-4 format of the QCIF size.

Figure 22:
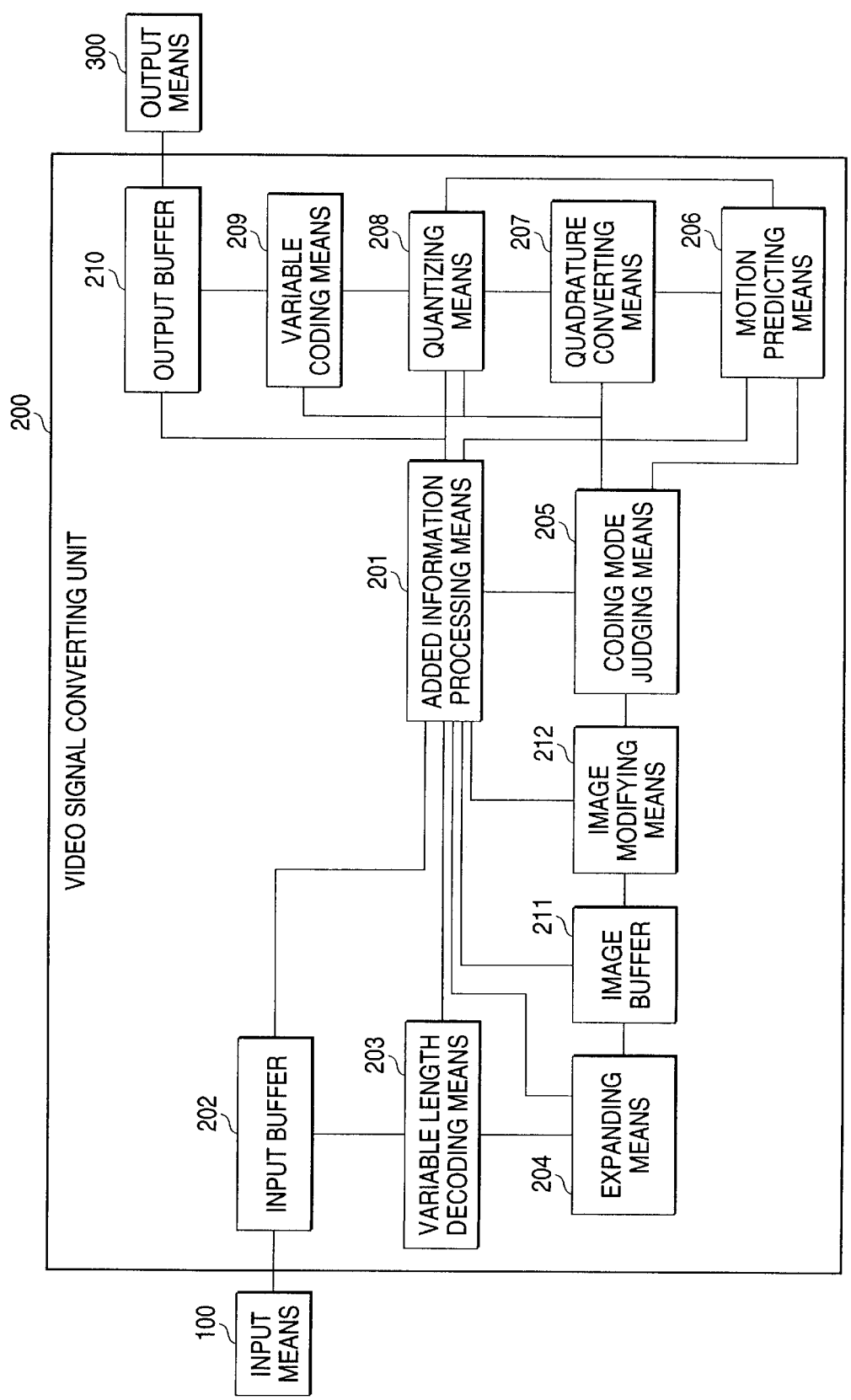
FIG. 22 is a functional block diagram of a video coding apparatus for converting macroblocks having different image sizes.

First, an internal arrangement of the video coding apparatus will now be explained. FIG. 22, is a functional block diagram for indicating the internal structure of this apparatus. As apparent from FIG. 22, the structural arrangement of this video coding apparatus is similar to the structural arrangement of the video coding apparatus shown in FIG. 20. An image modifying means 212 is additionally provided with the arrangement of the video coding apparatus indicated in FIG. 20. Also, an added information processing means 201 is similar to the arrangement shown in FIG. 5.

Figure 23:
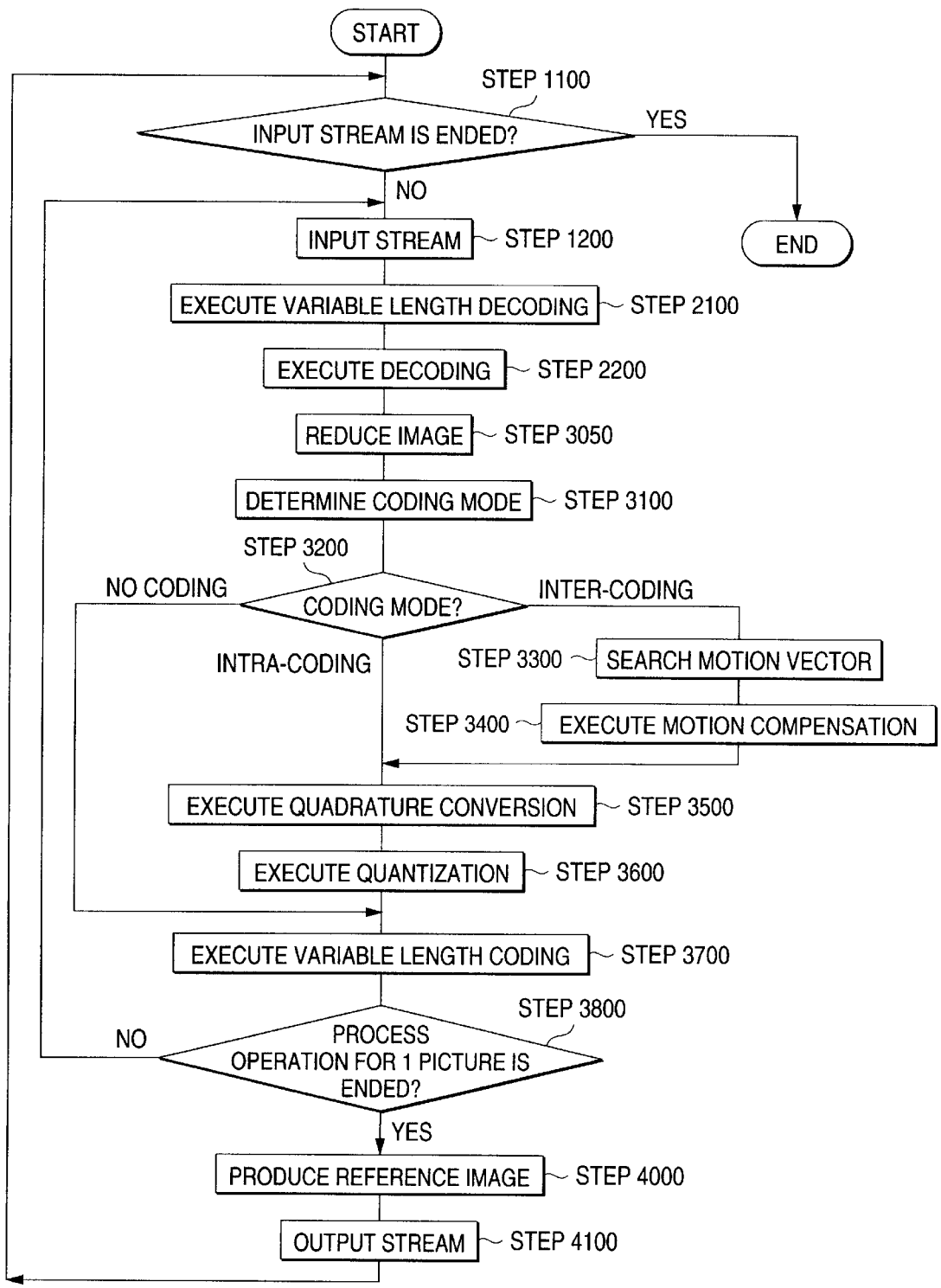
FIG. 23 is a flow chart for explaining a process operation of the video coding apparatus for converting the macroblocks having the different image sizes.

Next, a process operation of this video coding apparatus will now be explained. An overall process flow operation of this video coding apparatus is described in a flow chart shown in FIG. 23. As apparent from FIG. 23, this overall process flow operation own a different process operation from that of FIG. 2. That is, only an image reducing process operation as defined at a step 3050 is additionally provided. This image reducing process operation corresponds to such a process operation that an image of an input stream is reduced by ½ along both a longitudinal direction and a lateral direction in the unit of 1 macroblock, 4 macroblocks, or 1 picture. Since the known image reducing method may be introduced as this reducing process operation and this image reducing method does not constitute a major subject of this seventh utilization example, a detailed explanation thereof is omitted. It should also be noted that as a process operation of an image buffer, the process operation shown in FIG. 21 may be employed.

The process operation of this video coding apparatus is featured by such a method for utilizing coding mode history information realized by both the added information processing means 201 and the coding mode judging means 205.

In the case that an input stream owns a CIF image size and an output stream owns a QCIF image size, since a total number of macroblocks contained in this input stream is different from a total number of macroblocks contained in the output stream, coding modes cannot be made in correspondence with each other. 1 macroblock of the output stream corresponds to 4 macroblocks of the input stream.

As a result, in the case that a coding mode of a certain macroblock of the output stream is determined, if any one of the 4 corresponding macroblocks of the input stream is intra-coded and thus the coding mode of this macroblock is determined as the intra coding mode, then a frequency at which the macroblocks are intra-coded would be increased. Accordingly, there is such a possibility that the coding amount would be increased.

As a consequence, in accordance with this seventh utilization example, while the coding mode history information is used, a frequency at which one macroblock is intra-coded is decreased to a value smaller than, or equal to a constant value. Therefore, increasing of the coding amount can be suppressed.

Figure 24:
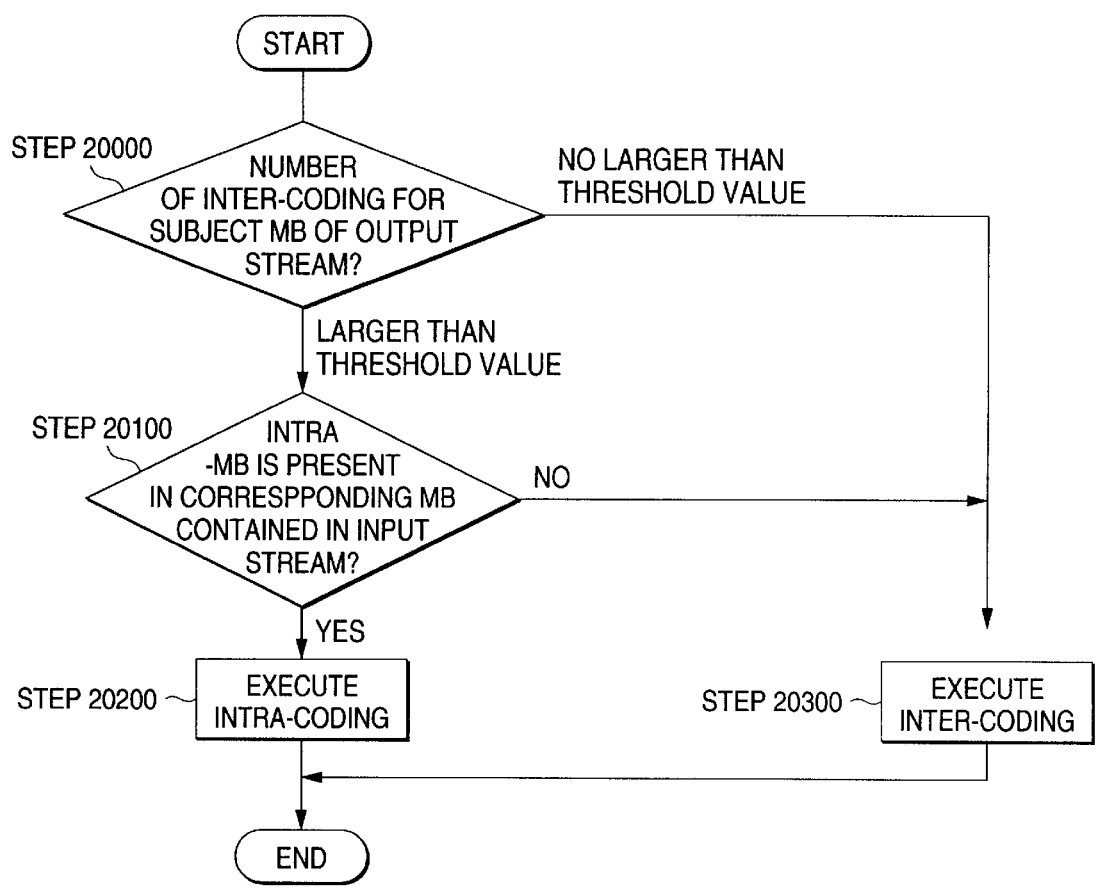
FIG. 24 is a flow chart for explaining a coding mode determining process operation by utilizing the coding mode of the input stream in the converting operation of the macroblocks having the different image sizes.

FIG. 24 is a flow chart for describing a process operation for judging a macroblock coding mode executed in this seventh utilization example. In this seventh utilization example, as a coding mode, only such a judgement process is employed so as to judge whether a relevant macroblock is intra-coded, or coded by other coding modes than this intra coding mode. In addition to this seventh utilization example, a decision of a coding mode such as non-code mode may be additionally provided.

As indicated in FIG. 24, in this seventh utilization example, a coding mode with respect to a single macroblock is determined in accordance with the following flow operation.

step 20000: The coding mode judging means 205 acquires a total number of coding operations in which after a subject macroblock of an output stream has been finally intra-coded, this subject macroblock is inter-coded with reference to the coding mode history information. If the acquired total number is larger than, or equal to a threshold value, step 20100: then the coding mode judging means 205 acquires from the added information processing means 201, such information indicating as to whether or not an intra-coded macroblock is present in macroblocks of the input stream corresponding to the subject macroblock.

step 20200: If the intra-coded macroblock is present, then this coding mode judging means 205 determines a coding mode of this subject macroblock as an intra-coding mode.

step 20300: If the intra-coded macroblock is not present, then the coding mode judging means 205 judges the coding mode of the subject macroblock as an inter-coding mode.

It should be noted that the threshold value used in the step 20000 may be arbitrarily set. This threshold value is set with respect to a total number of the macroblocks which have been inter-coded in the past. For example, in such a case that this threshold value is set to a total number (99 in this seventh utilization example) of macroblocks contained in 1 picture of the output stream, the following useful effect may be achieved when 1 macroblock per 1 picture is always intra-coded in the coding order within the input stream. That is, also in the output stream, the respective macroblocks are uniformly intra-coded. Also, when the value of this threshold value is increased, the appearing frequency of the macroblocks to be intra-coded is lowered, and the coding amount of the output stream is statically decreased. Conversely, when the value of this threshold value is decreased, the coding amount of the output stream is statically increased.

As explained above, in accordance with this seventh utilization example, even when the images having such different sizes are converted with each other, the coding mode of the output stream can be determined by utilizing the coding mode of the input stream. Since the coding mode can be judged without executing the process operation in which the difference between the present picture and the preceding picture is acquired in each of the macroblocks, the total processing amount can be reduced.

As previously explained, in accordance with this third embodiment, the following useful effects may be achieved while converting the compression formats involving the CIF size.

That is to say, even when the coding orders of the macroblocks are different from each other, the compression format converting operation may be carried out with having such a delay amount smaller than 1 picture.

Also, even when the compression format converting operation is performed between the streams having the different image sizes from each other, the processing amount required to determine the coding mode can be reduced.

While the present invention has been described in detail, in accordance with the video coding method of the present invention, there is an advantage when the motion vector of the input stream is reused. That is, the deterioration in the image quality can be reduced which is caused by reusing such a vector whose motion prediction error is large.

Furthermore, while omitting the decoding operation for the input stream and also the re-coding operation to the output stream, the deterioration in the image quality, which is caused by these decoding operation and re-coding operation, can be reduced. Also, the calculation amount required for the converting operation can be reduced.

In addition, there is a further advantage that the process delay required to convert the compression format can be in principle shortened up to the process delay of a single macroblock.

What is claimed is:

1. A video coding conversion method comprising the steps of:
   inputting a coded video input stream coded using a first compression format;
   decoding at least a part of said coded video input stream;
   determining coding information about said coded video input stream including other than decoded pixel values;
   producing a coded video output stream using a second compression format different from said first compression format, wherein said producing step utilizes said coding information.

2. The video coding conversion method of claim 1, wherein
   said coded video input stream includes a plurality of pictures with each picture having a plurality of sub-pictures, and wherein
   said coding information includes a coding mode of said sub-pictures, and wherein
   said producing step includes the step of said coding said sub-pictures in said coded video output stream based on said coding mode of said sub-pictures in said coded video input stream.

3. The video coding conversion method of claim 1, wherein
   said coded video input stream includes a plurality of pictures, each picture having a plurality of sub-pictures, and wherein
   said coding information includes a coding mode of said sub-pictures, and further wherein
   said method further comprises the step of determining a coding mode for said pictures in said coded video output stream based on said coding mode of said sub-pictures in said coded video input stream.

4. The video coding conversion method of claim 1, further comprising the steps of:
   determining coding mode history information including a count of the number of sub-pictures included in a plurality of pictures in said coded video output stream that have been continuously inter-coded prior to a current picture being coded; and
   utilizing said coding mode history information for selecting sub-pictures from said coded video input stream to be intra-coded for said coded video output stream.

5. The video coding conversion method of claim 1, wherein both said coded video input stream and said coded video output stream are compressed using a motion-compensatable format, said method further comprising the steps of:
   extracting a first motion vector of a sub-picture included in said coded video input stream;
   transforming the format of said first motion vector into a second motion vector compatible with the format of said coded video output stream; and
   including said second motion vector with said coded video output stream.

6. The video coding conversion method of claim 1, further comprising the steps of:
   determining a value of a first motion vector included in said coded video input stream; and
   performing a search operation based on said value to obtain a second motion vector for including with said coded video output stream.

7. The video coding conversion method of claim 1, further comprising the steps of:
   obtaining a first motion vector from said coded video input stream, wherein said first motion vector had been derived by using a first filter-processed reference image;
   converting said first motion vector into a second motion vector based on a second reference image that has not been filter-processed; and
   converting said second motion vector into a third motion vector by using a third filter-processed image different from said first filter processed image, wherein said third motion vector is for including with said coded video output stream.

8. The video coding conversion method of claim 1, wherein the coded video input stream includes:
   a sub-picture;
   a motion vector associated with said sub-picture; and
   a motion prediction error including subtraction information, wherein said method further comprises the steps of:
   calculating a magnitude of said subtraction information,
   calculating an accuracy of said motion vector by utilizing said magnitude; and
   deciding, based on said accuracy, a method for utilizing the motion vector of said input stream.

9. The video coding conversion method of claim 8, further comprising the step of changing a search range of a motion vector searching operation in response to said accuracy.

10. The video coding conversion method of claim 8, further comprising the step of using said accuracy to determine whether to perform a motion vector searching operation.

11. The video coding conversion method of claim 8, wherein said accuracy is used for determining an encoding format for encoding said sub-picture for including in said coded video output stream.

12. The video coding conversion method of claim 2, further comprising the steps of
   detecting, in said coded video input stream, an intra-picture in which an entire picture having a plurality of sub-pictures is intra-coded; and
   outputting at least one of said sub-pictures in said second coding format in said coded video output stream before said entire picture has been fully inputted.

13. The video coding conversion method of claim 12, further comprising the steps of:
executing a compression converting process operation at the level of said sub-pictures while also producing intra-block information including information about whether each of said plurality of sub-pictures is intra-coded; and
determining that said plurality of sub-pictures are intra-coded by referring to said intra-block information at about the instant in time when all of said plurality of sub-pictures have been inputted.

14. The video coding conversion method of claim 2, wherein said method utilizes said coding information including an orthogonal transform coefficient obtained from said coded video input stream.

15. The video coding conversion method of claim 2, wherein said method utilizes said coding information including a quantized orthogonal transform coefficient obtained from said coded video input stream.

16. The video coding conversion method of claim 2, wherein,
when said sub-picture of said coded video input stream is intra-coded, said sub-picture is also intra-coded for said coded video output stream, and further wherein
if an orthogonal transform coefficient is utilized in said coded video input stream for said sub-picture, then said orthogonal transform coefficient is also utilized for said coded video output stream; and still further wherein,
if a quantized orthogonal transform coefficient is utilized in said coded video input stream for said sub-picture, then said quantized orthogonal transform coefficient is also utilized for said coded video output stream.

17. The video coding conversion method of claim 2, wherein,
when said sub-picture of said coded video input stream is inter-coded using motion compensation, said sub-picture is also inter-coded using motion compensation for said coded video output stream, and further wherein
if an orthogonal transform coefficient which makes use of subtraction information is utilized in said coded video input stream for said sub-picture, then said orthogonal transform coefficient is also utilized for said coded video output stream; and still further wherein,
if a quantized orthogonal transform coefficient is utilized in said coded video input stream for said sub-picture, then said quantized orthogonal transform coefficient is also utilized for said coded video output stream.

18. The video coding conversion method of claim 2, wherein said method further comprises the steps of:
utilizing a quantizer matrix for said sub-pictures included in said coded video input stream as an output quantizer matrix for sub-pictures included in said coded video output stream, wherein said quantizer matrix shows the relation between a quantization value and a position of each of a plurality of orthogonal transform coefficients in an orthogonal transform coefficient unit region; and
quantizing each of said plurality orthogonal transform coefficients using said quantization value.

19. The video coding conversion method of claim 2, wherein a quantizing value of each of a plurality of sub-pictures in said coded video output stream is set to a quantizing value of an orthogonal transform coefficient of a low frequency area of a sub-picture in said coded video input stream.

20. The video coding conversion method of claim 2, wherein, when a plurality of sub-pictures of said coded video input stream correspond to a sub-picture of said coded video output stream,
a coding mode of said sub-picture of said coded video output stream is set to an intra-coding mode when at least one of said plurality of sub-pictures of said coded video input stream is intra-coded; and further wherein, when a number of said plurality of sub-pictures which have been intra-coded exceeds a predetermined threshold amount,
said coding mode of said sub-picture of said coded video output stream is set to an intra-coding mode.

21. The video coding conversion method of claim 2, further comprising the step of:
storing a certain number of sub-pictures included in a picture of said coded video input stream in a first sequence,
encoding said stored pictures consecutively in a second sequence when said certain number of stored sub-pictures have been stored; and
including said encoded picture in said coded video output stream in said second sequence, wherein
said first sequence of said sub-pictures in said coded video input stream is different from said second sequence of said sub-pictures included in said coded video output stream, and further wherein
said certain number is at least equal to the number of sub-pictures required to generate said second sequence for including in said coded video output stream.

22. A video image encoding apparatus comprising:
decoding means for decoding at least a portion of a coded video input stream coded in a first compression format corresponding to a digital moving picture;
added information processing means for determining coding information about said coded video input stream including other than decoded pixel values; and
encoding means for encoding the decoded video input stream into a second compression format different from said first compression format by utilizing said coding information to produce a coded video output stream corresponding to said digital moving picture.

23. The video coding conversion method of claim 22, wherein
said coded video input stream includes a plurality of pictures, each picture having a plurality of sub-pictures, and wherein
said coding information includes a coding mode of said sub-pictures, and further wherein
said apparatus further comprises means for determining a coding mode for said sub-pictures in said coded video output stream based on said coding mode of said sub-pictures in said coded video input stream.

24. The video coding conversion method of claim 22, wherein
said coded video input stream includes a plurality of pictures, each picture having a plurality of sub-pictures, and wherein
said coding information includes a coding mode of said sub-pictures, and further wherein
said apparatus further comprises means for determining a coding mode for said pictures for including in said coded video output stream based on said coding mode of said sub-pictures in said coded video input stream.

25. The video image encoding apparatus of claim 22, wherein said coding information includes coding mode history information including a count of the number of sub-pictures included in a plurality of pictures in the coded video output stream that have been continuously inter-coded prior to a current picture being coded, said apparatus further comprising:

means for utilizing said coding mode history information for selecting sub-pictures from said coded video input stream to be intra-coded for said coded video output stream.

26. The video image encoding apparatus of claim 22, wherein both said coded video input stream and said coded video output stream are compressed using a motion-compensatable format, and wherein said apparatus further comprises:

means for extracting a first motion vector of a sub-picture included in said coded video input stream; and means for transforming the format of said first motion vector into a second motion vector compatible with the format of said coded video output stream, wherein said second motion vector is included with said coded video output stream.

27. The video coding conversion method of claim 22, further comprising:

means for determining a value of a first motion vector included in said coded video input stream; and means for performing a search operation based on said value to obtain a second motion vector for including with said coded video output stream.

28. The video image encoding apparatus of claim 22, further comprising:

means for obtaining a first motion vector from said coded video input stream, wherein said first motion vector had been derived by using a first filter-processed reference image;

means for converting said first motion vector into a second motion vector based on a second reference image that has not been filter-processed; and means for converting said second motion vector into a third motion vector by using a third filter-processed image different from said first filter processed image, wherein said encoding means includes said third motion vector with said coded video output stream.

29. The video image encoding apparatus of claim 22, wherein the coded video input stream includes:

a sub-picture;

a motion vector associated with said sub-picture; and a motion prediction error including subtraction information, and wherein said apparatus further comprises:

means for calculating a magnitude of said subtraction information, means for calculating an accuracy of said motion vector utilizing said magnitude; and means for deciding, based on said accuracy, whether to transform said motion vector into an output motion vector included with said coded video output stream.

30. The video image encoding apparatus of claim 29, further comprising means for changing a search range of a motion vector searching operation in response to said accuracy.

31. The video image encoding apparatus of claim 29, further comprising means for using said accuracy to determine whether to perform a motion vector searching operation.

32. The video image encoding apparatus of claim 29, wherein said accuracy is used for determining an encoding format for encoding said sub-picture for including in said coded video output stream.

33. The video image encoding apparatus of claim 22, further comprising:

means for detecting, in said coded video input stream, an intra-picture in which an entire picture having a plurality of sub-pictures is intra-coded; and means for outputting at least one of said sub-pictures in said second coding format in said coded video output stream before said entire picture has been fully inputted.

34. The video image encoding apparatus of claim 33, further comprising:

means for executing a compression converting process operation at the level of said sub-pictures while also producing intra-block information including information about whether said plurality of sub-pictures is intra-coded; and means for determining that said plurality of sub-pictures are intra-coded by referring to said intra-block information at about the instant in time when all of said plurality of sub-pictures have been input.

35. The video image encoding apparatus of claim 22, wherein said apparatus utilizes said coding information including an orthogonal transform coefficient obtained from said coded video input stream.

36. The video image encoding apparatus of claim 22, wherein said apparatus utilizes said coding information including a quantized orthogonal transform coefficient obtained from said coded video input stream.

37. The video image encoding apparatus of claim 22, wherein, when said sub-picture of said coded video input stream is intra-coded, said sub-picture is also intra-coded for said coded video output stream, and further wherein if coefficient is utilized in said coded video input stream for said sub-picture, then said orthogonal transform coefficient is also utilized for said coded video output stream; and still further wherein, if a quantized orthogonal transform coefficient is utilized in said coded video input stream for said sub-picture, then said quantized orthogonal transform coefficient is also utilized for said coded video output stream.

38. The video image encoding apparatus of claim 22, wherein, when said sub-picture of said coded video input stream is inter-coded using motion compensation, said sub-picture is also inter-coded using motion compensation for said coded video output stream, and further wherein, if an orthogonal transform coefficient which makes use of subtraction information is utilized in said coded video input stream for said sub-picture, then said orthogonal transform coefficient is also utilized for said coded video output stream; and still further wherein, if a quantized orthogonal transform coefficient is utilized in said coded video input stream for said sub-picture, then said quantized orthogonal transform coefficient is also utilized for said coded video output stream.

39. The video image encoding apparatus of claim 22, further comprising:

means for utilizing a quantizer matrix for said sub-pictures included in said coded video input stream as an output quantizer matrix for sub-pictures included in said coded video output stream, wherein said quantizer matrix shows the relation between a quantization value and a position of a each of a plurality of orthogonal transform coefficients in an orthogonal transform coefficient unit region; and means for quantizing each of said plurality orthogonal transform coefficients using said quantization value.

40. The video image encoding apparatus of claim 22, wherein a quantizing value of each of a plurality of sub-pictures in said coded video output stream is set to a quantizing value of an orthogonal transform coefficient of a low frequency area of a sub-picture in said coded video input stream.

41. The video image encoding apparatus of claim 22, wherein, when a plurality of sub-pictures of said coded video input stream correspond to a sub-picture of said coded video output stream, a coding mode of said sub-picture of said coded video output stream is set to an intra-coding mode when at least one of said plurality of sub-pictures of said coded video input stream is intra-coded; and further wherein, when a number of said plurality of sub-pictures which have been intra-coded exceeds a predetermined threshold amount, said coding mode of said sub-picture of said coded video output stream is set to an intra-coding mode.

42. The video image encoding apparatus of claim 22, further comprising:

means for storing a certain number of sub-pictures included in a picture of said coded video input stream in a first sequence;

means for encoding said stored pictures consecutively in a second sequence when said certain number of stored sub-pictures have been stored; and means for including said encoded picture in said coded video output stream in said second sequence, wherein said first sequence of said sub-pictures in said coded video input stream is different from said second sequence of said sub-pictures included in said coded video output stream; and further wherein said certain number is at least equal to the number of sub-pictures required to generate said second sequence for including in said coded video output stream.

* * * * *

UNITED STATES PATENT AND TRADEMARK OFFICE
CERTIFICATE OF CORRECTION

PATENT NO. : 6,798,837 B1
DATED : September 28, 2004
INVENTOR(S) : Uenoyama et al.

It is certified that error appears in the above-identified patent and that said Letters Patent is hereby corrected as shown below:

Title page,
Item [56], References Cited, U.S. PATENT DOCUMENTS, please delete "5,709,473 A * 1/1998 Sultan et al. .......... 374/131" and insert therefor -- 5,708,473 * 1/1998 Mead .......... 348/416 --.

Signed and Sealed this

Twenty-sixth Day of July, 2005

JON W. DUDAS
*Director of the United States Patent and Trademark Office*